(12) United States Patent
Hikichi

(10) Patent No.: US 11,948,027 B2
(45) Date of Patent: Apr. 2, 2024

(54) IMAGE FORMING APPARATUS HAVING FUNCTION OF ADJUSTING PRINT POSITION

(71) Applicant: CANON KABUSHIKI KAISHA, Tokyo (JP)

(72) Inventor: Yukiyoshi Hikichi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/340,186

(22) Filed: Jun. 7, 2021

(65) Prior Publication Data

US 2021/0397914 A1 Dec. 23, 2021

(30) Foreign Application Priority Data

Jun. 17, 2020 (JP) ................................. 2020-104600

(51) Int. Cl.
*G06K 15/02* (2006.01)
*G06F 3/12* (2006.01)
*G06K 15/00* (2006.01)

(52) U.S. Cl.
CPC ......... *G06K 15/408* (2013.01); *G06K 15/002* (2013.01); *G06K 15/1806* (2013.01); *G06K 15/1868* (2013.01); *G06K 15/4065* (2013.01)

(58) Field of Classification Search
None
See application file for complete search history.

(56) References Cited

U.S. PATENT DOCUMENTS

| 7,583,282 | B2 | 9/2009 | Yamauchi | |
|---|---|---|---|---|
| 2007/0200568 | A1* | 8/2007 | Shioda | G01N 22/04 324/643 |
| 2007/0296751 | A1* | 12/2007 | Ono | B41J 11/0005 347/16 |
| 2008/0003000 | A1* | 1/2008 | Taki | G03G 21/203 399/44 |
| 2010/0309514 | A1* | 12/2010 | Tanaka | G06F 11/3058 358/1.15 |

(Continued)

FOREIGN PATENT DOCUMENTS

| JP | H10240078 | * | 9/1998 | ............. H04N 1/00 |
|---|---|---|---|---|
| JP | 2001253588 | * | 9/2001 | ............. G03G 21/00 |

(Continued)

*Primary Examiner* — Beniyam Menberu
(74) *Attorney, Agent, or Firm* — ROSSI, KIMMS & McDOWELL LLP

(57) ABSTRACT

An image forming apparatus that suppresses print position displacement. The image forming apparatus includes a plurality of sheet storage sections configured to store sheets. A sheet storage section to be used is selected out of the plurality of sheet storage sections. An image is formed on a sheet supplied from the selected sheet storage section and the image position is adjusted using adjustment values associated with the selected sheet storage section. When an update action performed by sheet replenishment or sheet replacement is detected for a sheet storage section, the sheet storage section for which the update action has been detected is controlled so as not to be selected by the selection unit until a predetermined time period elapses after detection of the update action.

11 Claims, 32 Drawing Sheets

(56) References Cited

U.S. PATENT DOCUMENTS

| | | | | |
|---|---|---|---|---|
| 2012/0163851 A1* | 6/2012 | Masuyama | ......... | G03G 15/6508 |
| | | | | 399/81 |
| 2014/0009767 A1* | 1/2014 | Tanigawa | ............... | H04N 1/393 |
| | | | | 358/474 |
| 2015/0055172 A1* | 2/2015 | Iida | .................... | G06K 15/4065 |
| | | | | 358/1.15 |
| 2017/0236042 A1* | 8/2017 | Brunner | ................ | G06F 3/1282 |
| | | | | 358/1.15 |

FOREIGN PATENT DOCUMENTS

| | | | | |
|---|---|---|---|---|
| JP | 2007086129 | * | 4/2007 | ............ G03G 21/00 |
| JP | 2007179195 | * | 7/2007 | ............... G06F 3/12 |
| JP | 2007206667 | A | 8/2007 | |
| JP | 2007322475 | A | 12/2007 | |
| JP | 2009063886 | * | 3/2009 | ............ G03G 21/00 |
| JP | 2012226378 | * | 11/2012 | ............ G03G 21/00 |
| JP | 2013246390 | * | 12/2013 | ............ G03G 15/20 |
| JP | 2015136810 | * | 7/2015 | ............... H04N 1/00 |
| JP | 2019145994 | * | 8/2019 | ............... H04N 1/00 |
| JP | 2020023102 | * | 2/2020 | ............... B41J 2/01 |
| JP | 2020056861 | A | 4/2020 | |

\* cited by examiner

FIG. 5A

SHEET LIBRARY EDIT — 400

| SHEET NAME 411 | SHEET LENGTH IN SUB SCANNING DIRECTION (mm) 412 | SHEET LENGTH IN MAIN SCANNING DIRECTION (mm) 413 | BASIS WEIGHT (g/m²) 414 | SURFACE PROPERTY 415 | COLOR 416 | AUTOMATIC PRINT POSITION ADJUSTMENT 417 |
|---|---|---|---|---|---|---|
| SHEET 1 | 210 | 297 | 75 | PLAIN PAPER | WHITE | — |
| SHEET 2 | 297 | 420 | 75 | PLAIN PAPER | WHITE | ENABLED |
| SHEET 3 | 216 | 279 | 150 | EMBOSSED | WHITE | — |
| SHEET 4 | 279 | 452 | 128 | COATED ON BOTH SIDES | WHITE | — |
| SHEET 5 | 210 | 297 | 75 | PLAIN PAPER | ORANGE | ENABLED |
| SHEET 6 | 210 | 297 | 75 | PLAIN PAPER | PINK | — |

NEWLY ADD 420 | EDIT 421 | DELETE 422 | PRINT POSITION ADJUSTMENT 423

FIG. 5B

SHEET LIBRARY EDIT — 400

| SHEET NAME 411 | AFTER-REPLENISHMENT USABLE TIME SETTING 431 | TIME REQUIRED TO BECOME AUTOMATICALLY SELECTABLE (HEATER IS ON) (MINUTES) 432 | TIME REQUIRED TO BECOME AUTOMATICALLY SELECTABLE (HEATER IS OFF) (MINUTES) 433 | USABLE HUMIDITY SETTING 434 | USABLE HUMIDITY (%) 435 |
|---|---|---|---|---|---|
| SHEET 1 | SET | 20 | 30 | SET | 50-60 |
| SHEET 2 | NOT SET | 20 | 30 | NOT SET | 50-60 |
| SHEET 3 | SET | 30 | 40 | SET | 50-60 |
| SHEET 4 | NOT SET | 30 | 40 | NOT SET | 50-60 |
| SHEET 5 | SET | 20 | 30 | SET | 50-60 |
| SHEET 6 | NOT SET | 20 | 30 | NOT SET | 50-60 |

| NEWLY ADD 420 | EDIT 421 | DELETE 422 | PRINT POSITION ADJUSTMENT 423 |

FIG. 6

| | | |
|---|---|---|
| SHEET ATTRIBUTE EDIT | | |
| SHEET NAME | SHEET 5 | ~501 |
| SHEET LENGTH IN SUB SCANNING DIRECTION (mm) | 210 | ~502 |
| SHEET LENGTH IN MAIN SCANNING DIRECTION (mm) | 297 | ~503 |
| BASIS WEIGHT (g/m²) | 75 | ~504 |
| SURFACE PROPERTY | PLAIN PAPER ▼ | ~505 |
| COLOR | WHITE ▼ | ~506 |
| PRE-PRINTED SHEET | ☑ | ~507 |
| AUTOMATIC PRINT POSITION ADJUSTMENT | ☑ ~508   15 | ~509 |
| AFTER-REPLACEMENT/ REPLENISHMENT USABLE TIME SETTING (MINUTES) ☑ 510 | WHEN HEATER IS ON  20 | ~511 |
| | WHEN HEATER IS OFF  30 | ~512 |
| USABLE HUMIDITY SETTING (%) ☑  LOWER LIMIT 50  513 | UPPER LIMIT 60  514 | ~515 |

520 — EDIT COMPLETE

521 — CANCEL

| | | MEASURED VALUE (820) | IDEAL VALUE (821) | PRINT POSITION DISPLACEMENT AMOUNT (822) |
|---|---|---|---|---|
| 801 | LEAD POSITION (FRONT SIDE) | $\dfrac{C + E}{2}$ | 1 cm | MEASURED VALUE − IDEAL VALUE |
| 802 | SIDE POSITION (FRONT SIDE) | $\dfrac{F + J}{2}$ | 1 cm | MEASURED VALUE − IDEAL VALUE |
| 803 | MAIN SCANNING MAGNIFICATION (FRONT SIDE) | $\dfrac{(B - D - F) + (B - H - J)}{2}$ | SHEET LENGTH IN MAIN SCANNING DIRECTION − 2 cm | $\dfrac{\text{(MEASURED VALUE − IDEAL VALUE)}}{\text{IDEAL VALUE}}$ |
| 804 | SUB SCANNING MAGNIFICATION (FRONT SIDE) | $\dfrac{(A - C - G) + (A - E - I)}{2}$ | SHEET LENGTH IN SUB SCANNING DIRECTION − 2 cm | $\dfrac{\text{(MEASURED VALUE − IDEAL VALUE)}}{\text{IDEAL VALUE}}$ |
| 805 | RIGHT-ANGLE CORRECTION AMOUNT (FRONT SIDE) | $\dfrac{S + T}{2}$ | 0 cm | MEASURED VALUE |
| 806 | TRAPEZOIDAL CORRECTION AMOUNT (FRONT SIDE) | $(B - D - F) - (B - H - J)$ | 0 cm | MEASURED VALUE |
| 807 | LEAD POSITION (REVERSE SIDE) | $\dfrac{K + M}{2}$ | 1 cm | MEASURED VALUE − IDEAL VALUE |
| 808 | SIDE POSITION (REVERSE SIDE) | $\dfrac{N + R}{2}$ | 1 cm | MEASURED VALUE − IDEAL VALUE |
| 809 | MAIN SCANNING MAGNIFICATION (REVERSE SIDE) | $\dfrac{(B - L - N) + (B - P - R)}{2}$ | SHEET LENGTH IN MAIN SCANNING DIRECTION − 2 cm | $\dfrac{\text{(MEASURED VALUE − IDEAL VALUE)}}{\text{IDEAL VALUE}}$ |
| 810 | SUB SCANNING MAGNIFICATION (REVERSE SIDE) | $\dfrac{(A - K - O) + (A - M - Q)}{2}$ | SHEET LENGTH IN SUB SCANNING DIRECTION − 2 cm | $\dfrac{\text{(MEASURED VALUE − IDEAL VALUE)}}{\text{IDEAL VALUE}}$ |
| 811 | RIGHT-ANGLE CORRECTION AMOUNT (REVERSE SIDE) | $\dfrac{U + V}{2}$ | 0 cm | MEASURED VALUE |
| 812 | TRAPEZOIDAL CORRECTION AMOUNT (REVERSE SIDE) | $(B - L - N) - (B - P - R)$ | 0 cm | MEASURED VALUE |

FIG. 15

STATE CONFIRMATION/CONSUMABLES — 1310

| PRINT/COPY | STORAGE | CONSUMABLES/OTHERS | | |
|---|---|---|---|---|
| JOB STATUS | JOB LOG | | | PRINT ▼ |

| TIME | JOB NAME | USER NAME | STATUS | APPROXIMATE WAITING TIME |
|---|---|---|---|---|
| ⚠ 10/1 16:29 | CAR MANUAL | Guest | PRINTING | 2 MINUTES |
| 10/1 16:30 | SEMINAR GUIDE | Guest | IN QUEUE | 4 MINUTES |
| 10/1 16:40 | MEMO | Guest | IN QUEUE | 5 MINUTES |
| 10/1 16:42 | SAMPLE | Guest | IN QUEUE | 6 MINUTES |
| 10/1 16:44 | CAR MANUAL | Guest | IN QUEUE | 10 MINUTES |

1311

| INTERRUPT/PRIORITY | DETAILS | CANCEL | STOP ALL JOBS |
|---|---|---|---|
| | | | CLOSE |

 Sheets having a possibility of print position displacement are designated. Job name: CAR MANUAL

| | | |
|---|---|---|
| | SHEET ATTRIBUTE EDIT | 500 |

SHEET NAME [SHEET 5] ~501

SHEET LENGTH IN SUB SCANNING DIRECTION (mm) [210] ~502

SHEET LENGTH IN MAIN SCANNING DIRECTION (mm) [297] ~503

BASIS WEIGHT (g/m²) [75] ~504

SURFACE PROPERTY [PLAIN PAPER ▼] ~505

COLOR [WHITE ▼] ~506

507 ☑ PRE-PRINTED SHEET
    FREQUENCY (NORMAL TIME: AT EVERY DESIGNATED NUMBER OF SHEETS)
    FREQUENCY (IMMEDIATELY AFTER REPLENISHMENT: AT EVERY DESIGNATED NUMBER OF SHEETS)

508 ☑ AUTOMATIC PRINT POSITION ADJUSTMENT (INTERRUPT MODE) [2000] ~523  [40] ~524

510 ☑ AFTER-REPLACEMENT/ REPLENISHMENT USABLE TIME SETTING (MINUTES)
    WHEN HEATER IS ON [20] ~511
    WHEN HEATER IS OFF [30] ~512

513 ☑ USABLE HUMIDITY SETTING (%)  LOWER LIMIT [50]  UPPER LIMIT [60]
                                                  514            515

522 ☑ REFLECT LENGTH OF EXPANSION/SHRINKAGE AFTER REPLENISHMENT ON ADJUSTMENT VALUES

[EDIT COMPLETE] ~520  [CANCEL] ~521

FIG. 21

| ITEM | MEASURED VALUE | IDEAL VALUE | PRINT POSITION DISPLACEMENT AMOUNT |
|---|---|---|---|
| MAIN SCANNING MAGNIFICATION (FRONT SIDE) | $\dfrac{((297+1)-10-10)+((297+1)-10-10)}{2}$ | $\dfrac{(297-10-10)+(297-10-10)}{2}$ | $\dfrac{278-277}{277} = 0.0036$ |
| SUB SCANNING MAGNIFICATION (FRONT SIDE) | $\dfrac{((420+1)-10-10)+((420+1)-10-10)}{2}$ | $\dfrac{(420-10-10)+(420-10-10)}{2}$ | $\dfrac{401-400}{400} = 0.0025$ |

| TYPE: PLAIN PAPER 1 (80 – 90g/m²) SIZE: A3 | | |
|---|---|---|
| ELAPSED TIME AFTER REPLENISHMENT | ADDITION/SUBTRACTION VALUE (mm) IN SHEET FEEDING DIRECTION | ADDITION/SUBTRACTION VALUE (mm) IN DIRECTION ORTHOGONAL TO SHEET FEEDING DIRECTION |
| LESS THAN 2 MINUTES | 1 | 1 |
| 2 OR MORE AND LESS THAN 5 MINUTES | 0.5 | 0.5 |
| 5 OR MORE AND LESS THAN 8 MINUTES | 0.2 | 0.2 |
| 8 OR MORE AND LESS THAN 10 MINUTES | 0.1 | 0.1 |
| 10 OR MORE AND LESS THAN 20 MINUTES | 0.05 | 0.05 |
| 20 OR MORE MINUTES | 0 | 0 |

FIG. 22B

| TYPE: THICK PAPER 1 (108 – 120g/m²) SIZE: A3 | | |
|---|---|---|
| ELAPSED TIME AFTER REPLENISHMENT | ADDITION/SUBTRACTION VALUE (mm) IN SHEET FEEDING DIRECTION | ADDITION/SUBTRACTION VALUE (mm) IN DIRECTION ORTHOGONAL TO SHEET FEEDING DIRECTION |
| LESS THAN 2 MINUTES | 1.2 | 1.2 |
| 2 OR MORE AND LESS THAN 5 MINUTES | 1 | 1 |
| 5 OR MORE AND LESS THAN 8 MINUTES | 0.5 | 0.5 |
| 8 OR MORE AND LESS THAN 10 MINUTES | 0.2 | 0.2 |
| 10 OR MORE AND LESS THAN 20 MINUTES | 0.1 | 0.1 |
| 20 OR MORE AND LESS THAN 30 MINUTES | 0.05 | 0.05 |
| 30 OR MORE MINUTES | 0 | 0 |

FIG. 25

SHEET LIBRARY EDIT — 410

| SHEET NAME (411) | CORRECTION BY TAKING LENGTH OF SHEET EXPANSION/SHRINKAGE AFTER REPLENISHMENT INTO ACCOUNT (441) | FREQUENCY OF INTERRUPT AUTOMATIC ADJUSTMENT (NORMAL TIME) (442) | FREQUENCY OF INTERRUPT AUTOMATIC ADJUSTMENT (IMMEDIATELY AFTER REPLENISHMENT) (443) |
|---|---|---|---|
| SHEET 1 | EXECUTE | 2000 | 40 |
| SHEET 2 | EXECUTE | 2000 | 40 |
| SHEET 3 | EXECUTE | 1000 | 30 |
| SHEET 4 | EXECUTE | 2000 | 40 |
| SHEET 5 | EXECUTE | 1000 | 30 |
| SHEET 6 | EXECUTE | 2000 | 40 |

NEWLY ADD (420)  EDIT (421)  DELETE (422)  PRINT POSITION ADJUSTMENT (423)

IMAGE FORMING APPARATUS HAVING FUNCTION OF ADJUSTING PRINT POSITION

BACKGROUND OF THE INVENTION

Field of the Invention

The present invention relates to an image forming apparatus having a function of adjusting a print position.

Description of the Related Art

Conventionally, there has been known an image forming apparatus that adjusts a print position based on a print position displacement amount acquired by reading an adjustment chart on which reference marks are printed (see e.g. Japanese Laid-Open Patent Publication (Kokai) No. 2007-206667).

However, it is known that a sheet used for printing (recording sheet) expands and shrinks depending on a moisture content thereof. Particularly, immediately after sheets are replenished or replaced for a sheet storage section, the moisture content of each sheet changes, causing changes in the dimensions of each sheet, until it reaches the equilibrium state. For this reason, for example, if the dimensions of each sheet largely change before and after print position adjustment, there is a fear that proper position adjustment cannot be performed based on the print position displacement amount.

SUMMARY OF THE INVENTION

The present invention provides an image forming apparatus capable of suppressing print position displacement.

In a first aspect of the present invention, there is provided an image forming apparatus including a plurality of sheet storage sections configured to store sheets, a selection unit configured to select a sheet storage section to be used out of the plurality of sheet storage sections, a forming unit configured to form, on a sheet supplied from a sheet storage section selected by the selection unit, an image whose position is adjusted using adjustment values associated with the selected sheet storage section, a detection unit configured to detect an update action performed by sheet replenishment or sheet replacement for each of the plurality of sheet storage sections, and a control unit configured to control a sheet storage section for which an update action has been detected so as not to be selected by the selection unit until a predetermined time period elapses after detection of the update action by the detection unit.

In a second aspect of the present invention, there is provided an image forming apparatus including a plurality of sheet storage sections configured to store sheets, a selection unit configured to select a sheet storage section to be used out of the plurality of sheet storage sections, a forming unit configured to form, on a sheet supplied from a sheet storage section selected by the selection unit, an image whose position is adjusted using adjustment values associated with the selected sheet storage section, an acquisition unit configured to acquire humidity of each of the plurality of sheet storage sections, and a control unit configured to perform, for a sheet storage section of which humidity acquired by the acquisition unit is out of a predetermined humidity range, control for inhibiting the sheet storage section from being selected by the selection unit until the acquired humidity becomes within the predetermined humidity range.

In a third aspect of the present invention, there is provided an image forming apparatus including a plurality of sheet storage sections configured to store sheets, a forming unit configured to form, on a sheet supplied from one of the plurality of sheet storage sections, an image whose position is adjusted using adjustment values associated with the sheet storage section, a detection unit configured to detect an update action performed by sheet replenishment or sheet replacement for the sheet storage section, and a correction unit configured to correct the adjustment values based on elapsed time after detection of the update action by the detection unit.

In a fourth aspect of the present invention, there is provided an image forming apparatus including a plurality of sheet storage sections configured to store sheets, a forming unit configured to form, on a sheet supplied from one of the plurality of sheet storage sections, an image whose position is adjusted using adjustment values associated with the sheet storage section, a detection unit configured to detect an update action performed by sheet replenishment or sheet replacement for the sheet storage section, an update unit configured to execute update processing for updating the adjustment values during a series of image formation processing operations performed by the forming unit, and a control unit configured to control a frequency of execution of the update processing performed by the update unit based on elapsed time after detection of the update action by the detection unit.

According to the present invention, it is possible to suppress print position displacement.

Further features of the present invention will become apparent from the following description of exemplary embodiments (with reference to the attached drawings).

BRIEF DESCRIPTION OF THE DRAWINGS

FIGS. 5A and 5B are diagrams each showing an example of a sheet library edit screen.
FIG. 6 is a diagram showing an example of a sheet attribute edit screen.
FIG. 9 is a diagram showing an example of adjustment values.
FIG. 15 is a diagram showing an example of a state confirmation screen.

FIG. 19 is a diagram showing an example of the sheet attribute edit screen.

FIG. 21 is a diagram showing a method of calculating correction values.

FIGS. 22A and 22B are diagrams each showing a table defining addition/subtraction values.

FIG. 25 is a diagram showing an example of the sheet library edit screen.

DESCRIPTION OF THE EMBODIMENTS

The present invention will now be described in detail below with reference to the accompanying drawings showing embodiments thereof.

Figure 1:
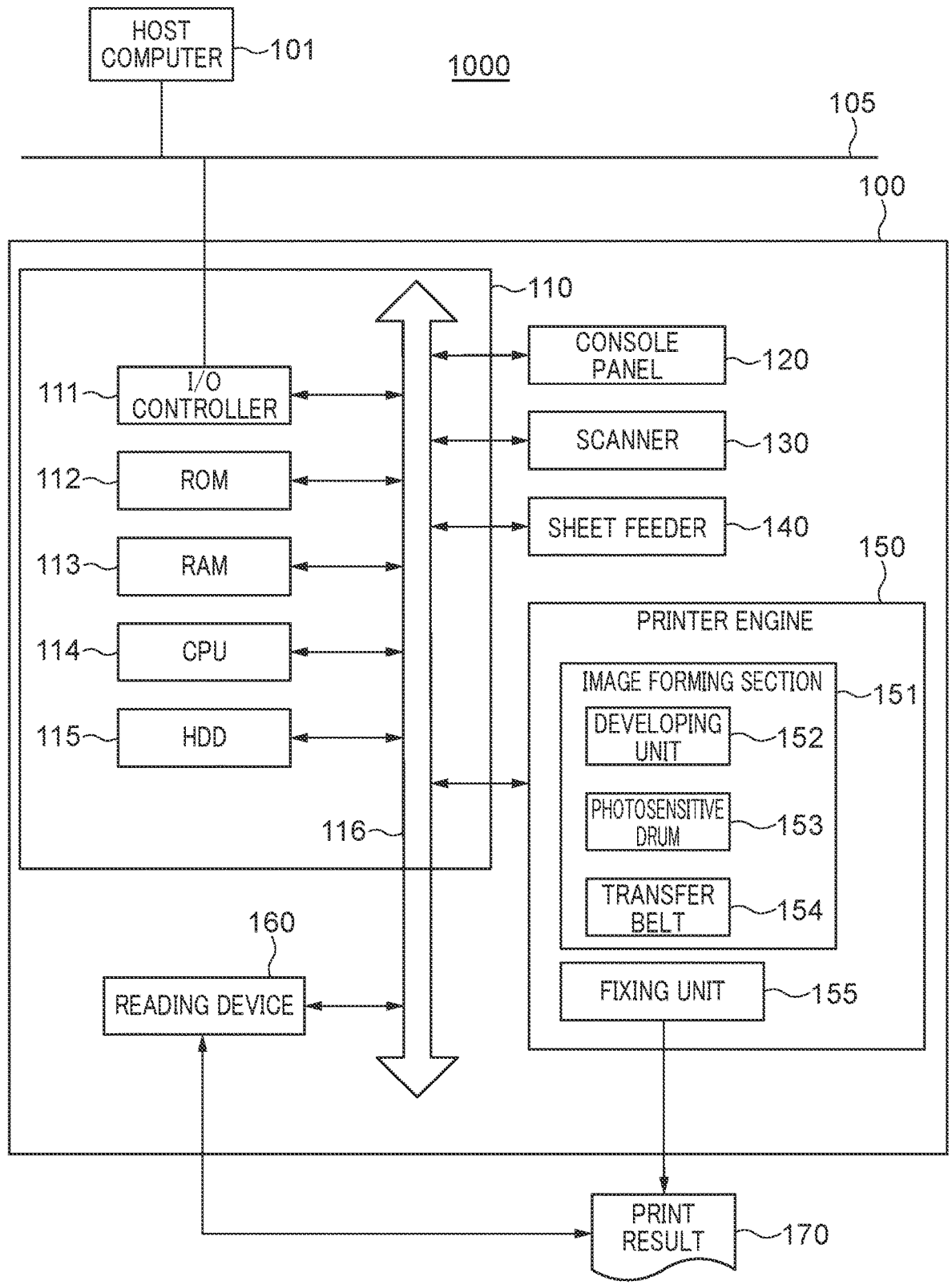
FIG. 1 is a block diagram of a printing system.

FIG. 1 is a block diagram of a printing system including an image forming apparatus according to a first embodiment of the present invention. This printing system, denoted by reference numeral 1000, includes the image forming apparatus, denoted by reference numeral 100, and a host computer 101. The image forming apparatus 100 and the host computer 101 are connected to each other via a communication line 105. Note that the respective numbers of host computers 101 and image forming apparatuses 100 connected via the communication line 105 are not particularly limited. The communication line 105 may be a network, such as a LAN or a WAN.

The host computer 101 is capable of acquiring input information input by a user using an input device, not shown, generating a print job based on the acquired input information, and transmitting the generated print job to the image forming apparatus 100.

The image forming apparatus 100 mainly includes a controller 110, a printer engine 150, a console panel 120, a scanner 130, a sheet feeder 140, and a reading device 160. The controller 110 performs various data processing operations and controls the operation of the image forming apparatus 100. The console panel 120 is provided with a touch panel and receives various operations from a user. The scanner 130 scans an original document using an optical sensor and acquires scanned image data. The sheet feeder 140 includes a plurality of sheet feed cassettes (sheet feed trays 325; see FIG. 4B). Each sheet feed cassette can store sheets as various recording sheets. In each sheet feed cassette, only one uppermost sheet of the stored sheets can be separated and conveyed to the printer engine 150. The printer engine 150 physically prints image data on a sheet. A printing result 170 by the printer engine 150 is read by the reading device 160, and the read result is fed back to the controller 110. Details of the reading device 160 will be described hereinafter with reference to FIG. 4A.

In the controller 110, an I/O controller 111 controls communication with an external network. A ROM 112 stores various control programs. The control programs stored in the ROM 112 are loaded into a RAM 113. A CPU 114 executes the control programs loaded into the RAM 113 to perform centralized control of image signals, various devices, and so forth. An HDD 115 stores large volumes of data, such as image data and print data, temporarily or on a long-term basis. The modules of the controller 110 are interconnected via a system bus 116. Further, the system bus 116 connects between the controller 110 and the devices in the image forming apparatus 100.

Note that the RAM 113 also functions as a main memory and a work memory for the CPU 114. Further, the control programs and an operating system are stored not only in the ROM 112, but also in the HDD 115. Further, mode setting information input from the console panel 120 may be stored in a NVRAM (Non-Volatile RAM), not shown.

The printer engine 150 includes an image forming section 151 and a fixing unit 155. The image forming section 151 includes a developing unit 152, a photosensitive drum 153, and a transfer belt 154. The image forming section 151 forms a toner image on the photosensitive drum 153 using the developing unit 152 according to image data generated by the controller 110. Further, the image forming section 151 transfers the toner image formed on the photosensitive drum 153 onto a sheet conveyed on the transfer belt 154. The image forming section 151 will be described hereinafter in detail with reference to FIG. 3. The fixing unit 155 fixes the toner image transferred onto the sheet by the image forming section 151. The fixing unit 155 includes a pressure roller and a heating roller, neither of which is shown. When a sheet passes between the rollers, toner is melted and pressed, whereby the toner image is fixed onto the sheet.

Figure 2:
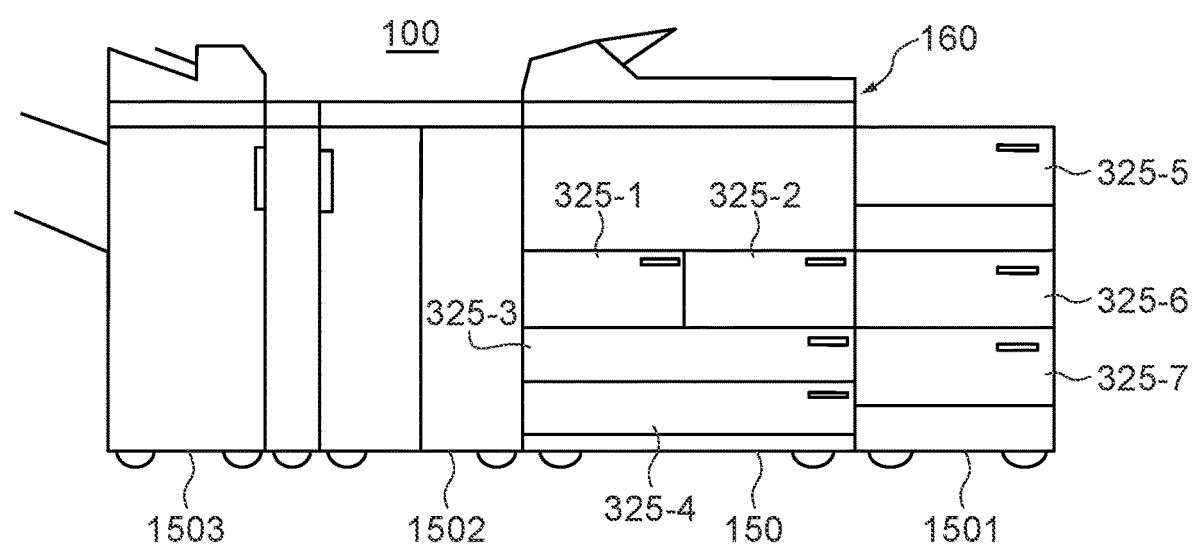
FIG. 2 is a schematic view of an image forming apparatus.

FIG. 2 is a schematic view of the image forming apparatus 100. The image forming apparatus 100 includes an optional sheet feed deck 1501, the printer engine 150, the reading device 160, a puncher 1502, and a bookbinder 1503. The image forming apparatus 100 is provided with e.g. seven sheet feed trays 325 as the plurality of sheet storage sections. Four sheet feed trays 325-1 to 325-4 are incorporated in the printer engine 150. Three sheet feed trays 325-5 to 325-7 are arranged in the optional sheet feed deck 1501. Since the plurality of sheet feed trays are provided, it is possible to continuously print a large number of sheets and store various sizes and types of sheets in advance. The number and arrangement of the sheet feed trays 325 are not particularly limited.

The controller 110 can select one of these seven sheet feed trays 325 as a sheet feed tray to be used for image formation. That is, the image forming apparatus 100 has an automatic tray-selecting function. With this automatic tray-selecting function, when a print job is input, if designation of the sheet feed tray 325 is set to "auto", it is possible to supply a sheet from a suitable sheet feed tray out of the plurality of sheet feed trays based on a sheet size and a sheet type. An operator (user) of the image forming apparatus 100 can instruct a print job without being conscious of a location of the sheet feed tray which is required to be replenished with sheets.

Figure 3:
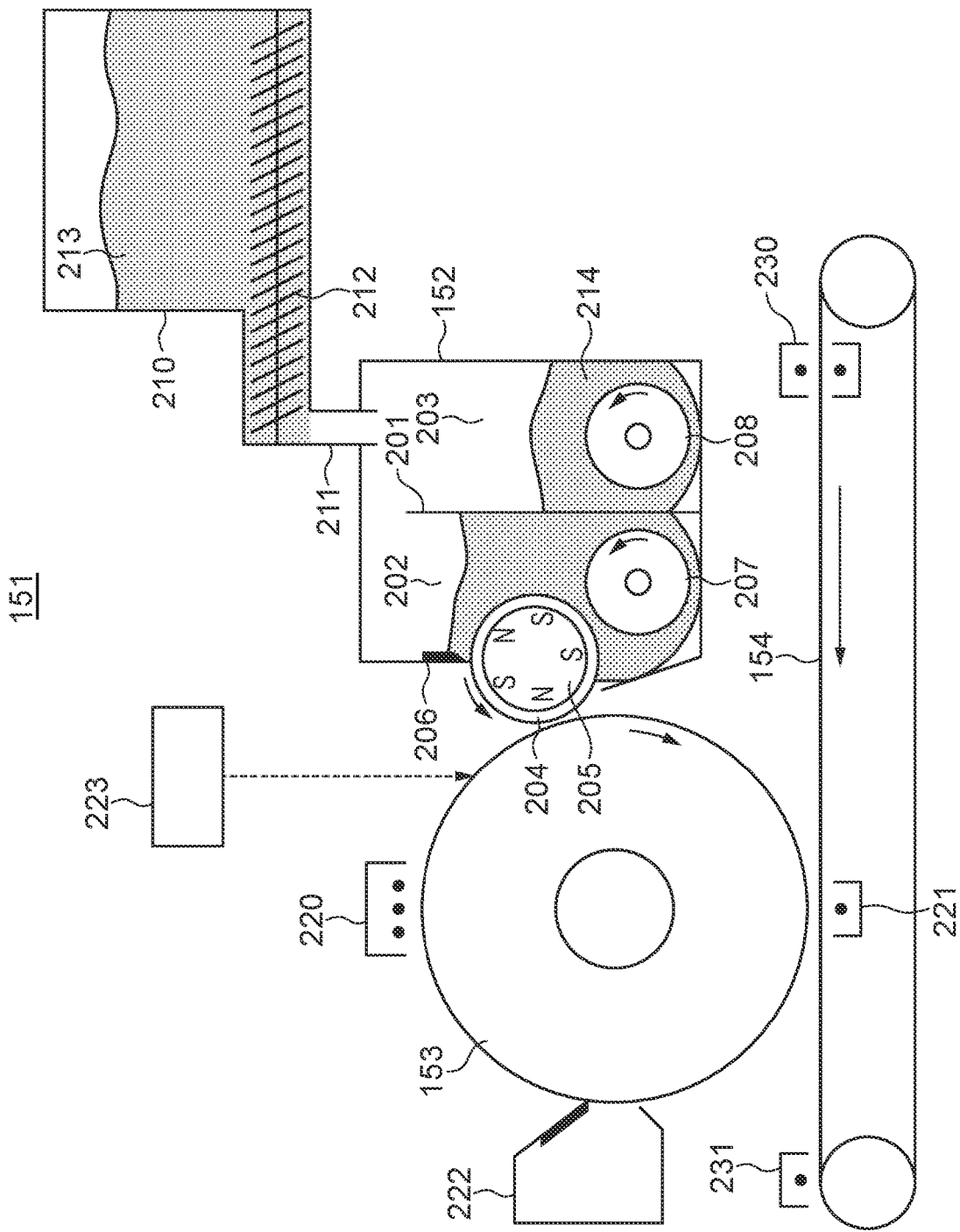
FIG. 3 is a schematic view showing the configuration of an image forming section.

FIG. 3 is a schematic view showing the configuration of the image forming section 151. The developing unit 152 is arranged in a state opposed to the photosensitive drum 153. The inside of the developing unit 152 is partitioned into a developing chamber 202 and a stirring chamber 203 by a partition wall 201 extending in a vertical direction. The developing chamber 202 is provided with a non-magnetic developing sleeve 204 which is rotated in a direction indicated by an arrow in FIG. 3 (anticlockwise direction). The developing sleeve 204 has a magnet 205 fixedly arranged therein. The developing sleeve 204 supports and conveys a layer of two-component developer (containing a magnetic carrier and a non-magnetic toner) whose thickness is regulated by a blade 206 and supplies the developer to the photosensitive drum 153 in a development area opposed to the photosensitive drum 153 to thereby develop an electrostatic latent image formed on the photosensitive drum 153. To increase the development efficiency, i.e. an application rate of toner to the electrostatic latent image, a developing bias voltage generated by superposing a DC voltage on an AC voltage is applied to the developing sleeve 204.

Screws 207 and 208 for stirring developer are arranged in the developing chamber 202 and the stirring chamber 203, respectively. The screw 207 stirs and conveys developer in the developing chamber 202. The screw 208 stirs and conveys toner 213 supplied from a toner discharge port 211 of a toner replenishment tank 210 by rotation of a conveying screw 212 and developer 214 in the developing unit 152 to make the toner density uniform. Note that the partition wall 201 is formed with developer passages (not shown) for communicating the developing chamber 202 and the stirring chamber 203 with each other at end portions thereof on the near side and the far side, as viewed in FIG. 3. The developer in the developing chamber 202, which is reduced in toner density by consumption of toner by development, is moved through one of the developer passages into the stirring chamber 203 by the conveying forces of the screws 207 and 208. Then, the developer whose toner density has recovered in the stirring chamber 203 is moved therefrom through the other developer passage into the developing chamber 202.

The photosensitive drum 153 is driven for rotation in a direction indicated by an arrow in FIG. 3 (clockwise direction). Around the photosensitive drum 153, there are sequentially arranged a primary charger 220 for uniformly charging the photosensitive drum 153, the developing unit 152, a transfer charger 221 for transferring a developed visible toner image onto a sheet, and a drum cleaner 222, in a direction of rotation of the photosensitive drum 153. An image exposure device 223 is arranged above the photosensitive drum 153. The image exposure device 223 is formed by a semiconductor laser, a polygon mirror, a reflective mirror, etc., and is responsive to an input of digital pixel signals (video data) corresponding to an image converted to digital signals by the controller 110, to irradiate the photosensitive drum 153 with a laser beam modulated according to the received signals. The image exposure device 223 irradiates the photosensitive drum 153 with a laser beam such that the laser beam scans the photosensitive drum 153 in a generatrix direction thereof between the primary charger 220 and the developing unit 152, whereby exposure is performed on the drum surface of the photosensitive drum 153 so as to form an electrostatic latent image. Then, rotation of the photosensitive drum 153 causes the electrostatic latent image to be developed into a visible toner image by the developing unit 152.

The transfer belt 154, which is endless, is arranged below the photosensitive drum 153 such that it is stretched between a plurality of rollers. The transfer belt 154 conveys a sheet in a direction indicated by an arrow in FIG. 3. A sheet supplied from the sheet feeder 140 is conveyed from the right side of the transfer belt 154 to the left side of the same, as viewed in FIG. 3, in a state supported on the transfer belt 154 by action of adhesion chargers 230 that are disposed opposed to each other across the transfer belt 154. When the sheet passes between the photosensitive drum 153 and the transfer charger 221, the visible toner image developed on the photosensitive drum 153 is transferred onto the sheet by action of the transfer charger 221. The sheet onto which the toner image has been transferred is separated from the transfer belt 154 by a discharging charger 231 and is conveyed to the fixing unit 155 (appearing in FIG. 1). Toner remaining on the photosensitive drum 153 after transferring the toner image onto the sheet is removed by the drum cleaner 222.

Figure 4A:
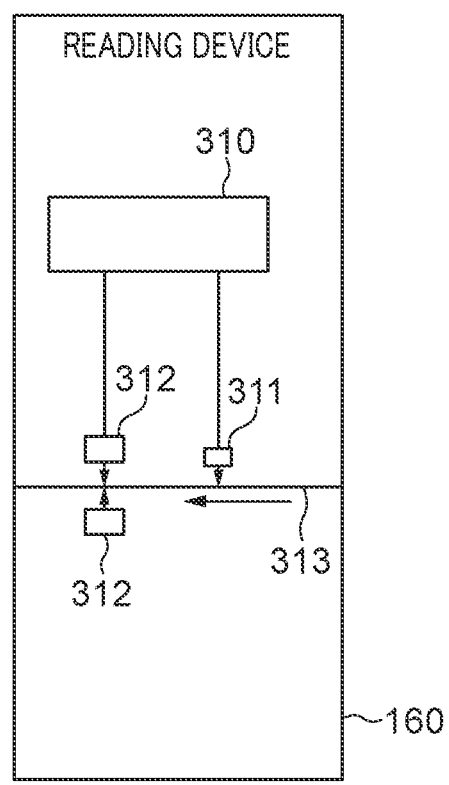
FIGS. 4A and 4B are a schematic cross-sectional view of a reading device and a block diagram of a sheet feeder, respectively.

FIG. 4A is a schematic cross-sectional view of the reading device 160. The reading device 160 includes a reading controller 310, sheet sensors 311, and two line sensors 312. A sheet which is printed matter to be read (such as an adjustment chart, shown in FIG. 8) passes on a conveying path 313 and is detected by the sheet sensors 311. The conveying path 313 is formed by a black conveying belt. Since the black conveying belt is used, the sheet sensors 311 can accurately detect a leading edge of a white sheet passing on the conveying path 313 and detect presence or absence of the sheet.

The sheet sensors 311 are arranged in plurality in a sheet width direction which is a direction orthogonal to a sheet conveying direction and a sheet thickness direction. The plurality of sheet sensors 311 each detect presence or absence of a sheet at respective positions and obtain a passing time at which the sheet passes. The reading controller 310 calculates an angle of skew of the sheet from a conveying speed of the conveying belt, based on change information in presence or absence of the sheet and the passing time of the leading edge of the sheet, which are sent from each sheet sensor 311.

Next, the reading controller 310 controls the line sensors 312 to read image data on a sheet by using a signal indicative of detection of presence or absence of a sheet as a trigger. The line sensors 312 are arranged at respective two vertical locations above and below the conveying path 313 such that they can read a front side and a reverse side of the sheet simultaneously. The reading controller 310 sends the calculated skew angle and the image data read by the line sensors 312 to the controller 110 (appearing in FIG. 1).

Sheets used for printing by the image forming apparatus 100 are managed by an operator using a database called a sheet library. The sheet library is stored in the HDD 115 or the RAM 113 and is read or written by each software module on an as-needed basis.

Figure 4B:
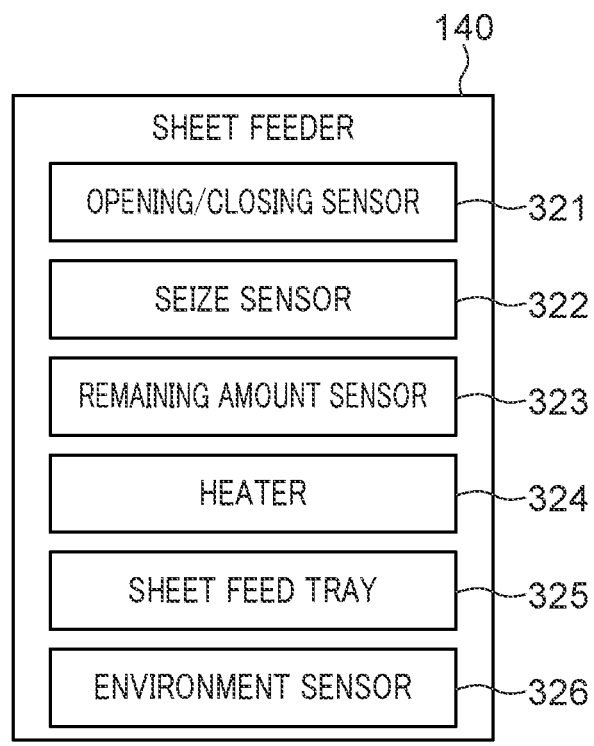

FIG. 4B is a block diagram of the sheet feeder 140. The sheet feeder 140 stores sheets for use in printing and supplies sheets for image formation. FIG. 4B shows one sheet feed tray 325 and components associated therewith. Each sheet feed tray 325 has the same components.

Each sheet feed tray 325 can be opened and closed. An opening/closing sensor 321 detects opening/closing of the sheet feed tray 325 when an operator stores sheets. A size sensor 322 detects the size of sheets set for replenishment or replacement in the sheet feed tray 325. A remaining amount sensor 323 detects an amount of stacked sheets in the sheet feed tray 325. Whether or not sheet replacement/replenishment is performed can be recognized based on a change in the amount of stacked sheets before and after the sheet feed tray 325 is opened and closed. A heater 324 is provided to keep sheets at a proper humidity. In a case where the humidity of sheets, detected immediately after replacement, is not suitable for printing, the heater 324 makes the sheets suitable for printing more quickly than without the same. An environment sensor 326 as an acquisition unit measures temperature and humidity in the sheet feed tray 325. Note that one environment sensor 326 may be commonly provided for the plurality of sheet feed trays 325. Further, a temperature sensor and a humidity sensor may be separately provided in place of the environment sensor 326.

FIGS. 5A and 5B are diagrams each showing an example of a sheet library edit screen. This sheet library edit screen, denoted by reference numeral 400, is displayed on the console panel 120 (appearing in FIG. 1). The sheet library edit screen 400 is an interface screen on which a user performs an operation, such as editing of the sheet library. As a sheet list 410 on the sheet library edit screen 400, a list of sheets registered in the sheet library is displayed. Sheet attributes are displayed as accompanying information in association with each sheet name.

In a case where the number of sheets registered in the sheet library is larger than the number of sheets which can be displayed on the sheet list 410 at one time, a vertical scroll bar 418 is used. The operator can display a desired sheet by operating the vertical scroll bar 418. The screen further has a horizontal scroll bar 419. The operator can view the attributes which cannot be displayed on one screen by scrolling the horizontal scroll bar 419 in a right-left direction. FIG. 5B shows the attributes which cannot be displayed in FIG. 5A.

An attribute 411 indicates the name of each sheet. The name of a sheet is specified e.g. by a user such that the sheets in the list can be distinguished from each other, and includes a manufacturer's name, a type of paper, etc. For example, the type of paper includes recycled paper, embossed paper, coated paper, etc. Attributes 412 to 417 and 431 to 435 indicate physical characteristics of each sheet and accompanying information.

The attribute 412 and the attribute 413 indicate the length of each sheet in a sub scanning direction (sheet length) and the length in a main scanning direction (sheet width), respectively. The attribute 414 indicates the basis weight of each sheet and the attribute 415 indicates the surface property of each sheet. The surface property is an attribute indicating the physical characteristics of a sheet surface and includes "coated" for a surface provided with a coating to increase glossiness, "embossed" for a surface formed with an uneven pattern, and so forth. The attribute 416 indicates the color of each sheet (color of a sheet itself).

The attribute 417 indicates the state of an adjustment operation for each sheet. The attribute 417 displays information on whether or not to automatically adjust a print position for a selected sheet. When the attribute 417 is set to "enabled", print position adjustment is performed in a case where sheets having the sheet name and set in a sheet feed tray are used.

Further, by touching a desired row on the sheet list 410 on the console panel 120, the user can select a sheet indicated on the touched row. The selected sheet is highlighted (displayed in reverse video). In FIG. 5A, a "sheet 5" is selected by way of example.

A new addition button 420 is a button for newly adding a sheet to the sheet library. An edit button 421 is a button for editing the attributes of a sheet selected on the sheet list 410. When the new addition button 420 or the edit button 421 is pressed, such an interface screen as shown in FIG. 6 is displayed on the console panel 120 in place of the sheet library edit screen 400.

A delete button 422 is for deleting a sheet selected on the sheet list 410 from the sheet library. A print position adjustment button 423 is for performing print position adjustment for a sheet selected on the sheet list 410. When this button is pressed, print position adjustment is performed on the spot on the selected one of the sheets registered in the sheet feeder 140.

On the screen shown in FIG. 5B, there are displayed columns of the attributes 431 to 435. The image forming apparatus 100 has an automatic selection function for automatically selecting the sheet feed tray 325 to be used out of the plurality of sheet feed trays 325. In a case where sheet replenishment or replacement (hereinafter referred to as the "update action") is performed for any of the sheet feed trays 325, whether or not the sheet feed tray 325 for which the update action has been performed should be set as one of selection targets in the automatically selection function is determined according to the values set in the attributes 431 to 435. Note that a change of any sheet attribute is included in the above-mentioned update action.

The attributes 431 and 434 are set to "set" or "not set". The attribute 431 is information indicating whether or not an after-replenishment usable time is set (a first predetermined designation) and is associated with each sheet feed tray 325 according to a user operation. In a case where the attribute 431 is set to "set", the sheet feed tray 325 for which an update action has been detected is excluded from the selection targets until a "predetermined time period" elapses after the detection of the update action. This is because since the humidity of sheets just set for replenishment is not stable, image position displacement can occur due to expansion/shrinkage of the sheets. This predetermined time period is determined according to the attribute 432 or 433. The predetermined time period in a state in which the heater 324 is on is determined according to the attribute 432, whereas the predetermined time period in a state in which the heater 324 is off is determined according to the attribute 433. The predetermined time period is a time period until the sheet feed tray 325 in question becomes usable after an update action has been performed therefor The attribute 434 is a designation for inhibiting the sheet feed tray from being selected as a sheet feed tray to be used until the humidity of sheets set therein becomes within a predetermined humidity range (a second predetermined designation). The attribute 434 is associated with each sheet feed tray 325 according to a user operation. In a case where the attribute 434 is set to "set", the sheet feed tray 325 for which an update action has been detected is excluded from the selection targets until the humidity of the sheet feed tray 325 becomes within the predetermined humidity range after detection of the update action. This is because in a case where the humidity is too high or too low, image position displacement can occur due to expansion/shrinkage of the sheets. The predetermined humidity range is determined according to the attribute 435.

FIG. 6 is a diagram showing an example of a sheet attribute edit screen. This sheet attribute edit screen, denoted by reference numeral 500, is an interface screen on which a user edits the sheet attributes, and is set for each sheet feed tray 325. Text boxes 501, 502, 503, and 504 are for inputting a sheet name, a sheet length in the sub scanning direction, a sheet length in the main scanning direction, and a basis weight, respectively. The user can input values in these text boxes using a software keyboard, a numeric keypad provided on the console panel 120, or the like, none of which is shown.

A combo box 505 is a box for designating a surface property of a sheet. In the combo box 505, a user can designate one surface property from a list of surface properties which are registered in advance and with which the image forming apparatus 100 is compatible. A combo box 506 is for specifying a color of the sheet. In the combo box 506, a user can designate one color closest to a sheet color from a list of colors registered in advance.

A check box 507 is for specifying whether or not the sheet is a pre-printed sheet. In a case where the sheet is a pre-printed sheet, an operator checks the check box 507. A check box 508 is for specifying whether or not to perform automatic print position adjustment. In a case where the check box 508 is checked, the attribute 417 in FIG. 5A is set to "enabled". When the attribute 417 is set to "enabled", print position adjustment is automatically performed when sheets having the sheet name and set in a sheet feeder 140 are used. For a print position adjustment interval, an initial value determined for each registered sheet in advance is used. Note that the initial value of the print position adjustment interval may be configured to be changeable by an operator using a text box 509. In this case, the operator can make the print position adjustment interval more suitable to a printing environment, on a registered sheet-by-registered sheet basis, by customizing the initial value displayed in the text box 509.

A check box 510 is a box for specifying whether or not to exclude the sheet feed tray 325, for which an update action has been detected, from the selection targets until a "predetermined time period" elapses after detection of the update action. When the check box 510 is checked, the attribute 431 (appearing in FIG. 5B) is set to "set". Text boxes 511 and 512 are for inputting predetermined time periods for the on-state and the off-state of the heater 324, respectively. The attributes 432 and 433 (appearing in FIG. 5B) are set to values entered in the text boxes 511 and 512, respectively.

A check box 513 is for specifying whether or not to inhibit selection of the sheet feed tray 325 for which an update action has been detected until its humidity becomes within the predetermined humidity range. When the check box 513 is checked, the attribute 434 (appearing in FIG. 5B) is set to "set". Text boxes 514 and 515 are for inputting a lower limit and an upper limit of the predetermined humidity range, respectively. The attribute 435 (appearing in FIG. 5B) as the predetermined humidity range is set to a range of values entered in the text boxes 514 and 515.

When an edit complete button 520 is pressed, the sheet attributes input at the time are finalized and stored in the sheet library. After that, the screen is returned from the sheet attribute edit screen 500 to the sheet library edit screen 400. When a cancel button 521 is pressed, editing of the sheet attributes is canceled, and then the screen is returned from the sheet attribute edit screen 500 to the sheet library edit screen 400.

Figure 7:
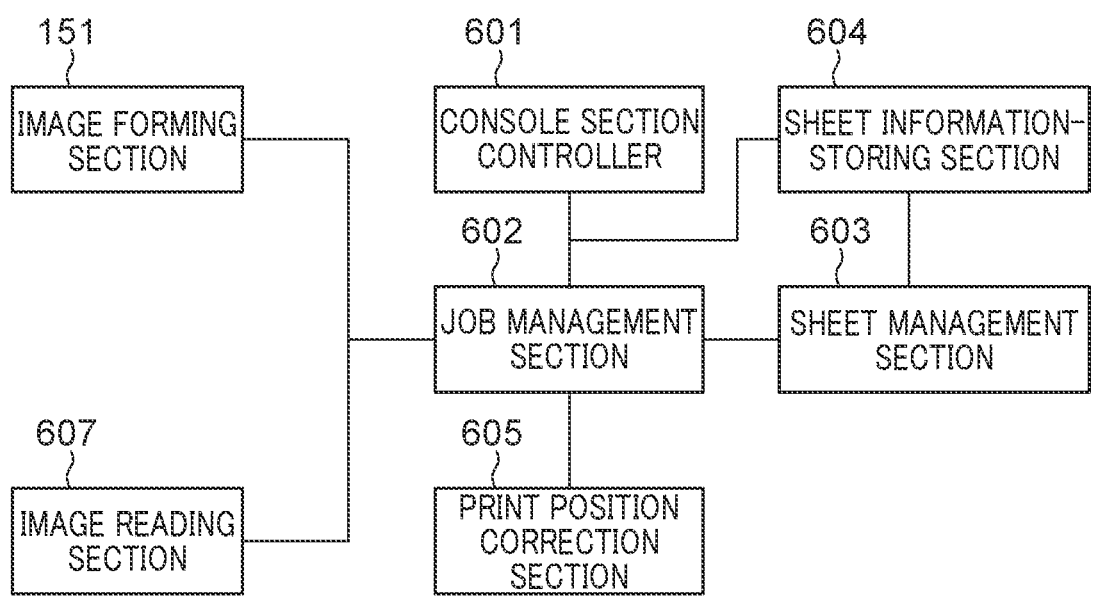
FIG. 7 is a block diagram showing function modules of the image forming apparatus.

FIG. 7 is a block diagram showing function modules of the image forming apparatus 100. Each function module is realized by the cooperation of the CPU 114, the RAM 113, the ROM 112, the HDD 115, the I/O controller 111, and so forth, of the controller 110 (appearing in FIG. 1). Each function is realized mainly by the CPU 114 that loads an associated program stored in the ROM 112 into the RAM 113 and executes the loaded program. A console section controller 601 controls the console panel 120 comprised of an LCD panel and a keyboard. A job management section 602 prints a print job received from the host computer 101 via the I/O controller 111 and an image for print position adjustment installed in the image forming apparatus 100, using the printer engine 150. A sheet information-storing section 604 stores attributes related to a sheet, which are input by an operator via the console section controller 601. A sheet management section 603 monitors remaining amounts of sheets, timings for sheet replacement, and so forth, using the various sensors of the sheet feeder 140. Further, the sheet management section 603 supplies sheets required to perform printing while referring to sheet information stored in the sheet information-storing section 604. A print position correction section 605 reads an adjustment image of an adjustment chart printed by the image forming section 151 using an image reading section 607 and calculates and stores adjustment values so as to correct print positions on the front and reverse sides of a sheet.

Figure 8A:
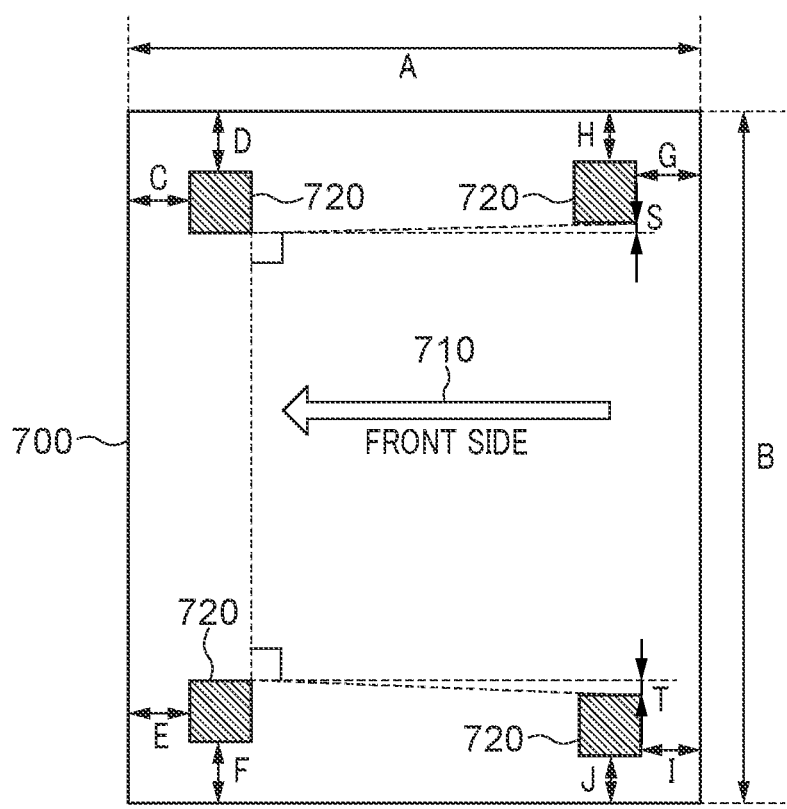
FIGS. 8A and 8B are diagrams each showing an example of an adjustment chart.
Figure 8B:
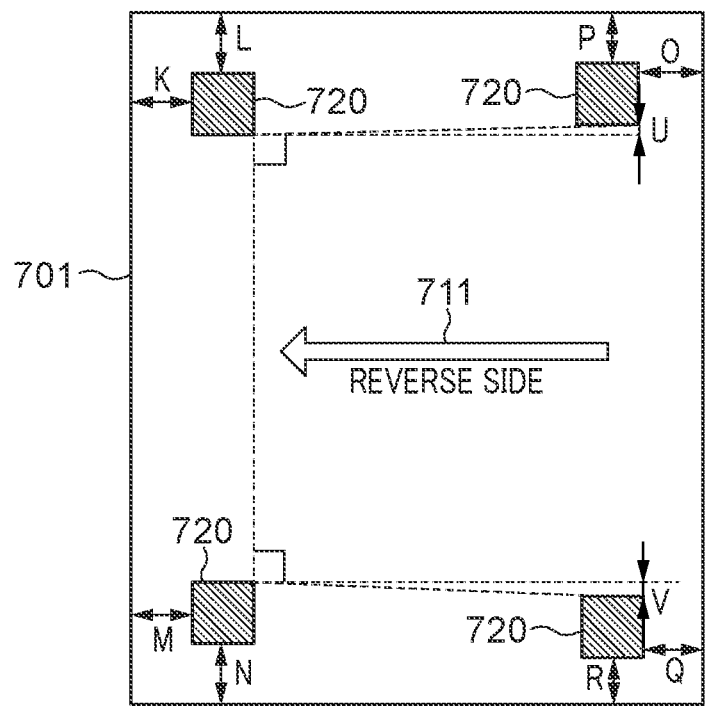

FIGS. 8A and 8B are diagrams each showing an example of the adjustment chart used for print position adjustment. The adjustment chart is printed in response to an instruction from the CPU 114 after starting print position adjustment. FIG. 8A shows a front side 700 of the adjustment chart, and FIG. 8B shows a reverse side 701 of the same. Arrows 710 and 711 are images printed on the adjustment chart for enabling an operator to identify a direction of conveying the adjustment chart and the front and reverse sides of the same. Character images of "FRONT SIDE" and "REVERSE SIDE" are printed in combination with the arrows 710 and 711, respectively. Note that the arrows 710 and 711, and the character images of "FRONT SIDE" and "REVERSE SIDE" are not necessarily required.

The same marks are printed on the front side 700 and the reverse side 701 of the adjustment chart. This is to make the adjustment chart usable for reading of the adjustment chart using e.g. a scanner, which requires an operation performed by an operator. The marks, denoted by reference numeral 720, are printed at predetermined positions on the adjustment chart. More specifically, the marks 720 are printed at a total of eight locations, i.e. at four corners of each of the front and reverse sides of the adjustment chart. Note that each mark 720 is generally formed by using toner of a color having a large difference in reflectivity from a sheet on which it is printed. In the present embodiment, the mark 720 is formed by black toner.

Each mark 720 is arranged to be printed at a location away from a sheet end by a predetermined distance assuming that the printed position of the mark is ideal. By measuring relative positions of the marks 720 on the adjustment chart, a displacement amount of the print position can be determined. Physical amounts A to V appearing in FIGS. 8A and 8B are measured. Physical amounts A and B represent a length in the sub scanning direction and a length in the main scanning direction of the adjustment chart, respectively. The ideal lengths are the sheet lengths in the respective directions defined in the sheet library. Physical amounts C to R each represent a distance from the mark 720 to a closest sheet end. The method of calculating the print position displacement amount based on the measured physical amounts A to V will be described below with reference to FIG. 9.

FIG. 9 is a diagram showing an example of adjustment values. Each adjustment value is information indicative of a position displacement direction and a position correction amount. With these adjustment values, the print position displacement amount is calculated from the measured values of the physical amounts A to V.

The adjustment values are associated with each sheet feed tray 325. The image forming section 151 functions, under the control of the CPU 114, as a forming unit for forming an image whose position is adjusted using the adjustment values associated with the sheet feed tray 325 to be used.

As shown in FIG. 9, the adjustment values include a lead position 801, a side position 802, a main scanning magnification 803, a sub scanning magnification 804, a right-angle correction amount 805, and a trapezoidal correction amount 806, with respect to the front side. Further, the adjustment values include a lead position 807, a side position 808, a main scanning magnification 809, a sub scanning magnification 810, a right-angle correction amount 811, and a trapezoidal correction amount 812, with respect to the reverse side. Measured values 820 are acquired by calculation based on results of reading the front side and the reverse side of the adjustment chart. For example, the measured value 820 of the lead position 801 is calculated by (C+E)/2. The measured value 820 of the side position 802 is calculated by (F+J)/2.

Ideal values 821 are known. Print position displacement amounts 822 are each acquired by calculation based on the measured value 820 and the ideal value 821 which are associated therewith. The respective ideal values of the lead positions 801 and 807 and the side positions 802 and 808 are determined by the nominal print positions of the marks, and are equal to 1 cm. The print position displacement amounts 822 of the lead positions 801 and 807 and the side positions 802 and 808 are each obtained by subtracting the ideal value associated therewith from the measured value associated therewith. The main scanning magnifications 803 and 809 are determined by the nominal print positions of the marks and the physical amount B (main scanning direction length−2). The print position displacement amounts 822 of the main scanning magnifications 803 and 809 are each obtained by (measured value−ideal value)/ideal value. The sub scanning magnifications 804 and 810 are determined by the nominal print positions of the marks and the physical amount A (sub scanning direction length−2). The print position displacement amounts 822 of the sub scanning magnifications 804 and 810 are each obtained by (measured value−ideal value)/ideal value. The respective ideal values of the right-angle correction amounts 805 and 811 and the trapezoidal correction amounts 806 and 812 are equal to 0 mm. The print position displacement amounts 822 of the right-angle correction amounts 805 and 811 and the trapezoidal correction amounts 806 and 812 are equal to the measured values 820. The print position displacement amounts 822 of the main scanning magnification and the sub scanning magnification are expressed in units of %. The calculated print position displacement amounts 822 are managed by the sheet library.

Examples of the method of actually measuring the physical amounts A to V include a method in which an operator measures the physical amounts using e.g. a ruler, and a method in which the physical amounts are calculated by image analysis on an image obtained by scanning the adjustment chart by the scanner 130. In the present embodiment, the physical amounts are calculated by image analysis on an image read by the reading device 160 connected to the printer engine 150. In this method of calculating the physical amounts based on an image read by the reading device 160, the line sensors 312 scan the adjustment chart passing therethrough. Then, sheet ends of the adjustment chart and edges of each mark 720 (boundaries between the sheet background and each mark 720) are detected from a density difference in the scanned image. Then, the physical amounts A to V are calculated from the detected sheet ends and edges of the marks 720.

Figure 10:
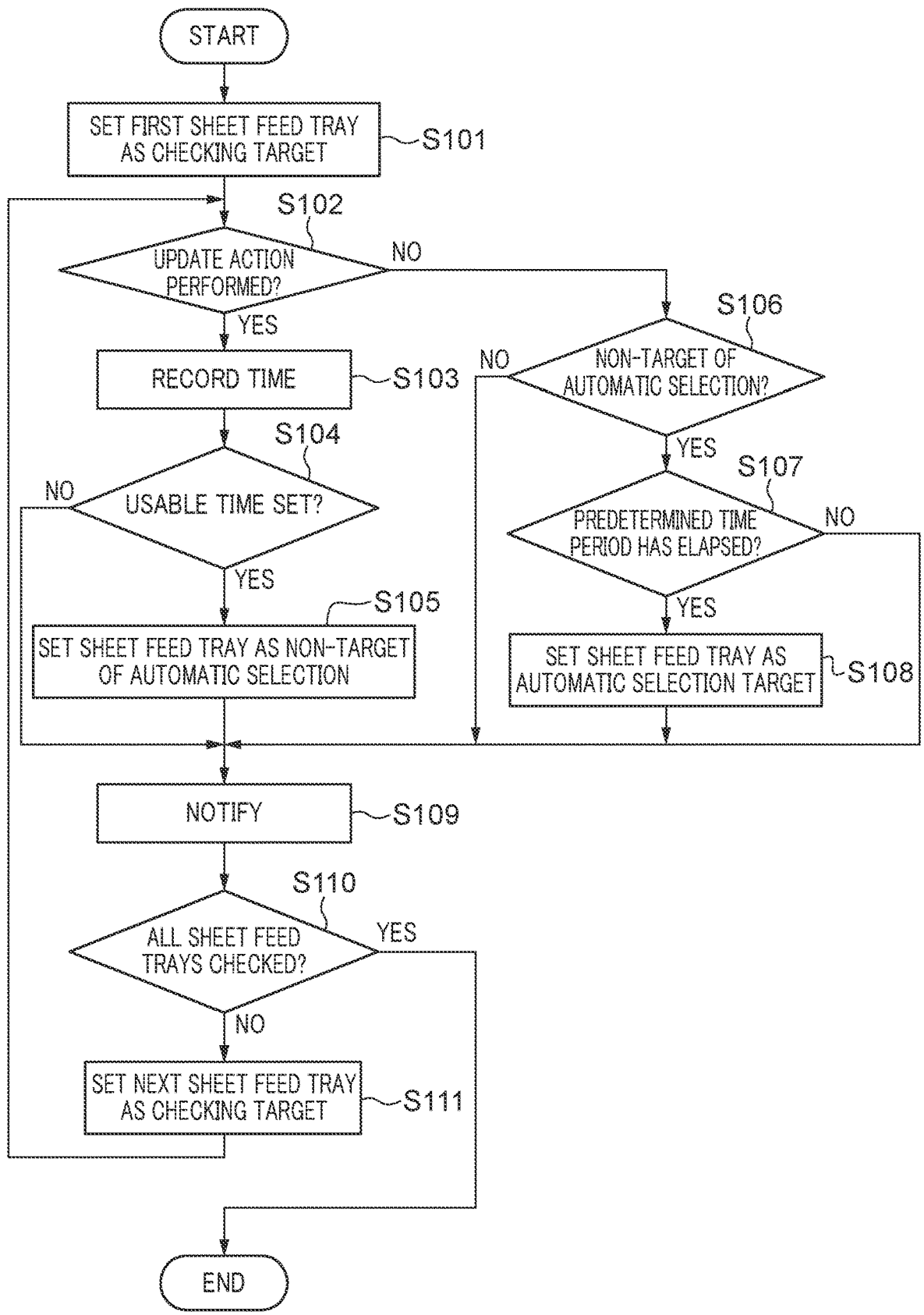
FIG. 10 is a flowchart of a selection target-setting process.

FIG. 10 is a flowchart of a selection target-setting process. This process is realized by the CPU 114 that loads an associated program stored in the ROM 112 into the RAM 113 and executes the loaded program. This process is periodically executed at predetermined time intervals. In this process, the CPU 114 functions as a control unit of the present invention.

First, in a step S101, the CPU 114 (the sheet management section 603) sets a first sheet feed tray 325 as a checking target. The order of setting each sheet feed tray 325 as the checking target is determined in advance. In a step S102, the CPU 114 (the sheet management section 603) determines whether or not the above-described update action has been performed with respect to the sheet feed tray 325 as the checking target based on detection results output from the opening/closing sensor 321 and the remaining amount sensor 323 of the sheet feeder 140.

For example, in a case where closing of the sheet feed tray 325 is detected by the opening/closing sensor 321 and the number of sheets set in the sheet feed tray 325 is increased compared with the number before opening the sheet feed tray 325, it is determined that the update action has been performed. Further, in a case where any sheet attribute has been changed by an operator via the console section controller 601, it is also determined that the update action has been performed. Whether or not the update action has been performed is determined by the CPU 114 (detection unit), based on the detection results output from the opening/closing sensor 321 and the remaining amount sensor 323 and the like If it is determined that the update action has been performed with respect to the sheet feed tray 325 as the checking target, the CPU 114 proceeds to a step S103, whereas if not, the CPU 114 proceeds to a step S106. In the step S103, the CPU 114 (the sheet management section 603) records a time at which the update action with respect to the sheet feed tray 325 as the checking target was performed in the RAM 113 as an update action time and starts a timer.

In a step S104, the CPU 114 (the sheet management section 603) determines whether or not the attribute 431 (appearing in FIG. 5B) indicating the after-replenishment usable time setting is set to "set" for the sheet feed tray 325 as the checking target. As described above, the attribute 431 is set to "set" by checking the check box 510 (appearing in FIG. 6). Then, if the attribute 431 is set to "not set" for the sheet feed tray 325 as the checking target, the CPU 114 (the sheet management section 603) proceeds to a step S109. On the other hand, if the attribute 431 is set to "set" for the sheet feed tray 325 as the checking target, the CPU 114 (the sheet management section 603) proceeds to the step S109 after executing a step S105.

In the step S105, the CPU 114 (the sheet management section 603) excludes the sheet feed tray 325 as the checking target from the selection targets for the automatic selection function (sets the sheet feed tray as a non-target of automatic selection). This sheet feed tray 325 is controlled so as not to be automatically selected until a predetermined time period elapses after detection of the update action. That is, in the process of a print job for which the automatic selection function is specified to be enabled, this sheet feed tray 325 is not selected as the sheet feed tray to be used until the predetermined time period elapses after detection of the update action. Since it is immediately after the update action was performed, the use of the sheet feed tray 325 which is unstable in humidity of the stored sheets is inhibited, whereby occurrence of print position displacement (printed position displacement) is avoided.

In the step S106, the CPU 114 (the sheet management section 603) determines whether or not the sheet feed tray 325 as the checking target is a non-target of automatic selection. If the sheet feed tray 325 as the checking target is not a non-target of automatic selection (is an automatic selection target), the CPU 114 (the sheet management section 603) proceeds to the step S109. However, if the sheet feed tray 325 as the checking target is a non-target of automatic selection, the CPU 114 (the sheet management section 603) proceeds to a step S107 to determine whether or not the predetermined time period has elapsed from the update action time. The update action time referred to here is a time recorded in the step S103. Further, the predetermined time period is a time period determined by the attribute 432 or 433 (appearing in FIG. 5B) depending on whether the heater 324 is on or off.

If it is determined in the step S107 that the predetermined time period has elapsed from the update action time, it is possible to judge that the humidity of the stored sheets is stable. Then, in a step S108, the CPU 114 (the sheet management section 603) sets the sheet feed tray 325 as the checking target as a selection target for the automatic selection function (automatic selection target). Therefore, in the process of a print job for which the automatic selection function is specified to be enabled, this sheet feed tray 325 can be selected as the sheet feed tray to be used. Then, the CPU 114 proceeds to the step S109. On the other hand, if the predetermined time period has not elapsed from the update action time, the humidity of the stored sheets is not stable, and hence the CPU 114 directly proceeds to the step S109. In the step S109, the CPU 114 executes notification processing. This notification processing will be described hereinafter with reference to FIG. 12.

After execution of the step S109, in a step S110, the CPU 114 (the sheet management section 603) determines whether or not all of the sheet feed trays 325 have been checked. When the sheet feed trays 325 have been sequentially set as the checking target, this means that all of the sheet feed trays 325 have been checked. On the other hand, if there is a sheet feed tray 325 which has not been checked, in a step S111, the CPU 114 sets a sheet feed tray 325 which is next in the above-mentioned order as the checking target and returns to the step S102. If all of the sheet feed trays 325 have been checked, the CPU 114 terminates the process in FIG. 10.

Figure 11:
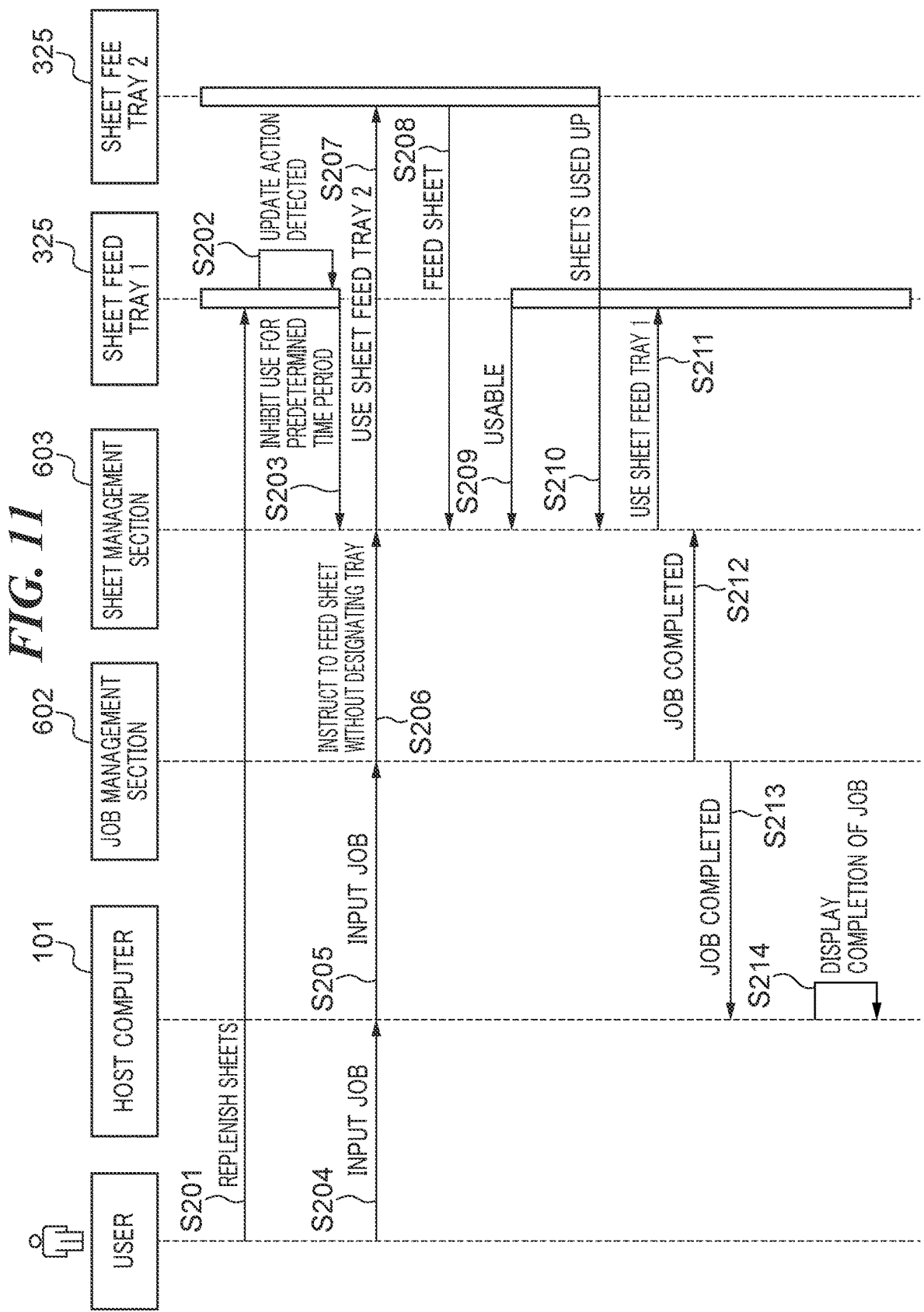
FIG. 11 is a diagram showing a sequence of a job process.

A specific example of execution of a print job input by a user of the image forming apparatus 100 will be described with reference to FIG. 11. FIG. 11 is a diagram showing a sequence of a job process. It is assumed, for the print job described here by way of example, that the automatic selection function is specified to be enabled, but that a sheet feed tray to be used is not designated. Further, "sheet feed tray 1" and "sheet feed tray 2" are the sheet feed trays 325 which are different from each other.

First, the user replenishes sheets in sheet feed tray 1 (S201). In sheet feed tray 1, it is detected e.g. by the opening/closing sensor 321 and the remaining amount sensor 323 that sheet replenishment or replacement (update action) has been performed (S202). Then, the sheet management section 603 determines not to use sheet feed tray 1 for a predetermined time period until the moisture-absorbing state of the sheets becomes stable (until the predetermined time period elapses) (S203). When the user gives a print job instruction for inputting a print job to the host computer 101 (S204), the print job is input to the job management section 602 (S205). Here, the job management section 602 instructs the sheet management section 603 to feed a sheet without designating a sheet feed tray to be used (S206).

The sheet management section 603 is aware that sheet feed tray 1 is a non-target of automatic selection. Note that sheet feed tray 1 and sheet feed tray 2 are assumed to store sheets matching a sheet size and a sheet type required for the current print job. Therefore, the sheet management section 603 instructs sheet feed tray 2 set as the automatic selection target to feed a sheet (S207). Sheet feed tray 2 starts feeding sheets (S208). When the predetermined time period has elapsed from the update action time, the sheet management section 603 determines that sheet feed tray 1 has become usable (S209).

When the sheets stored in sheet feed tray 2 are used up and sheet feed tray 2 becomes empty, the sheet management section 603 determines that sheet feed tray 2 is incapable of feeding sheets (S210). The sheet management section 603 continues the print job by instructing sheet feed tray 1 which has become an automatic selection target to start feeding sheets in place of sheet feed tray 2 (S211). When all pages of the print job have been printed, the job management section 602 sends a job completion notification. That is, the job management section 602 instructs the sheet management section 603 to stop feeding sheets (S212) and notifies the host computer 101 of completion of the job (S213). The host computer 101 displays a notification to the effect that the job has been completed on the screen to thereby notify the user of the job completion state (S214).

Note that in the process in FIG. 11, the CPU 114 (the sheet management section 603) functions as a selection unit configured to select a sheet feed tray to be used out of the plurality of sheet feed trays.

Figure 12:
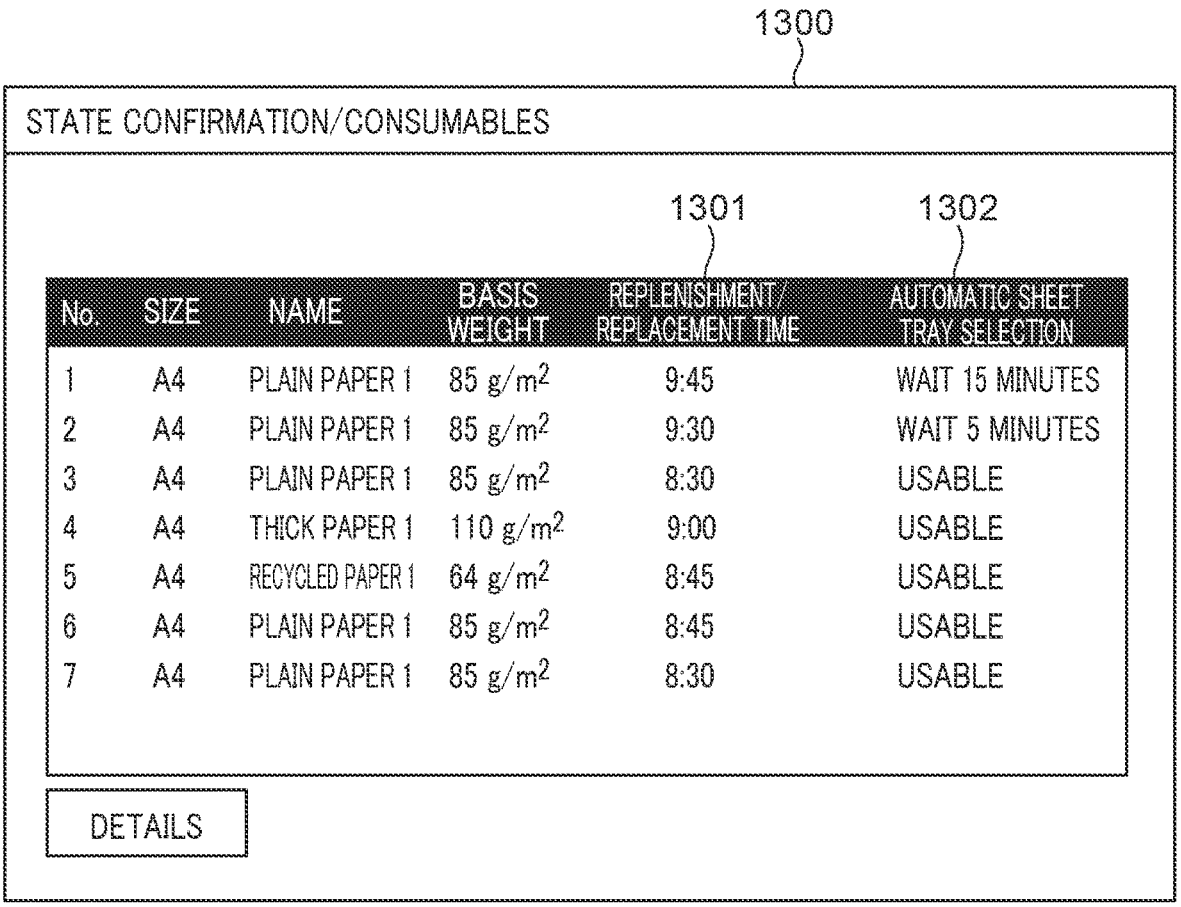
FIG. 12 is a diagram showing an example of a state confirmation screen.

FIG. 12 is a diagram showing an example of a state confirmation screen. This state confirmation screen, denoted by reference numeral 1300, is displayed on the screen of the console panel 120 by the notification processing executed in the step S109 in FIG. 10.

The state confirmation screen 1300 displays information related to sheets as consumables. The seven sheet feed trays 325 storing sheets are connected to the image forming apparatus 100. Nos. 1 to 7 correspond to the seven sheet feed trays 325, respectively. For example, the sheet feed tray assigned No. 1 stores sheets having a name of plain paper and an A4 size. A replenishment/replacement time column 1301 displays a time at which sheet replenishment/replacement (update action) was performed for the associated sheet feed tray. For example, the replenishment/replacement time column 1301 for the sheet feed tray assigned No. 1 displays that sheet replenishment/replacement was performed at 9:45 A.M.

An automatic sheet tray selection column 1302 displays information on whether or not the associated sheet feed tray is an automatic selection target and a remaining time until the sheet feed tray as a non-target is switched to an automatic selection target. For example, the automatic sheet tray selection column 1302 for the sheet feed tray assigned No. 1 displays that the sheet feed tray is excluded from the automatic selection targets, and "15 minutes" is required until it is switched to an automatic selection target. The automatic sheet tray selection column 1302 for the sheet feed tray assigned No. 3 displays that this sheet feed tray is an automatic selection target.

Therefore, the state confirmation screen 1300 notifies the user of a sheet feed tray determined not to be selected as a sheet feed tray to be used because an update action therefor has been detected. Further, the remaining time until the predetermined time period elapses after detection of the update action is notified. The user can easily grasp which sheet feed tray(s) is/are usable and when each unusable tray becomes usable. Note that the remaining time is not limited to be in the form of a value of time, but a degree of progress of the waiting time may be displayed in the form of percent. Further, whether the sheet feed tray is a target or non-target of automatic selection may be made identifiable by using different colors. Note that the notification processing may be performed by using voice.

Figure 13:
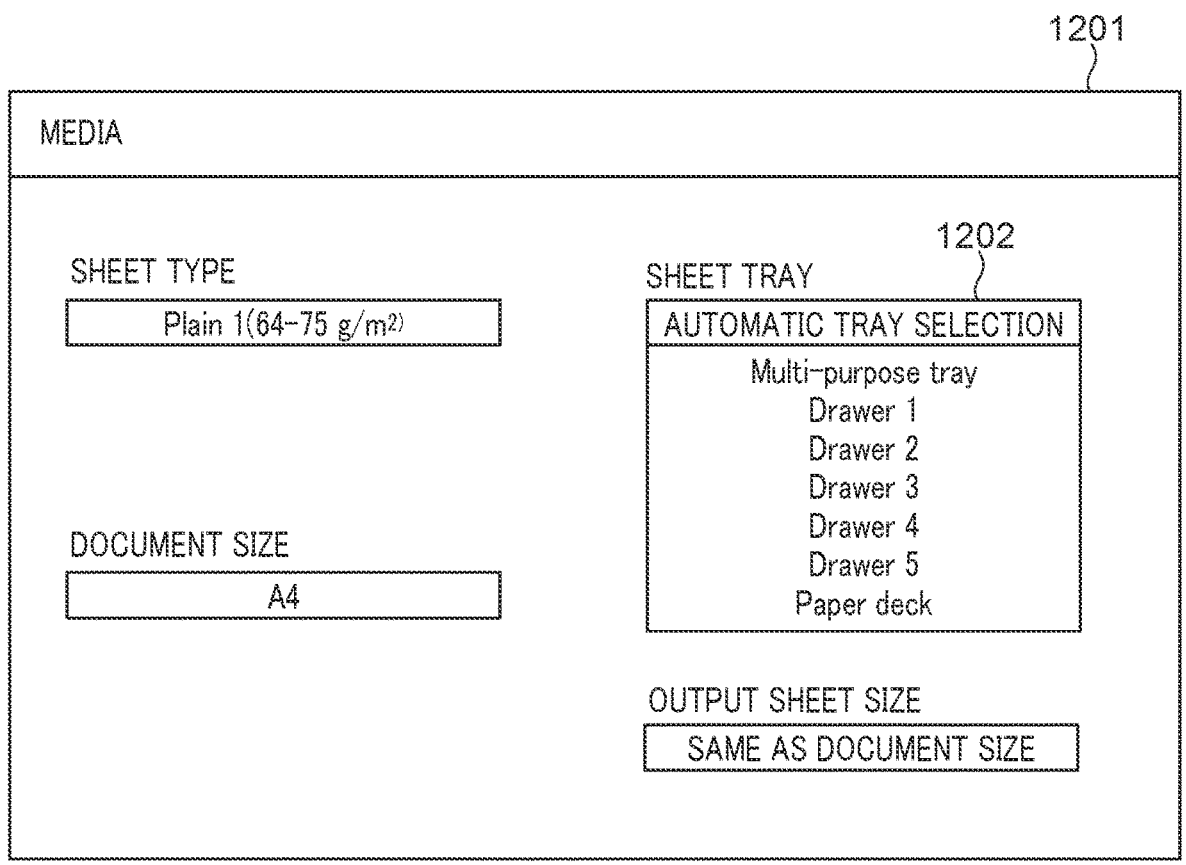
FIG. 13 is a diagram showing an example of a printer driver screen.

FIG. 13 is a diagram showing an example of a printer driver screen (media setting screen) for inputting a print job. The printer driver screen, denoted by reference numeral 1201, is displayed on the console panel 120.

For a print job input from the host computer 101, a sheet feed tray for use in printing can be forcibly designated. For example, a user can designate a sheet feed tray from which sheets are to be supplied for a print job in a sheet tray designation field 1202 on the printer driver screen 1201. When "automatic tray selection" is designated in the sheet tray designation field 1202, the automatic selection function is specified to be enabled. The automatic selection function is a default setting. Further, when one of the trays is selected in the sheet tray designation field 1202, the selected sheet feed tray is designated.

Figure 14:
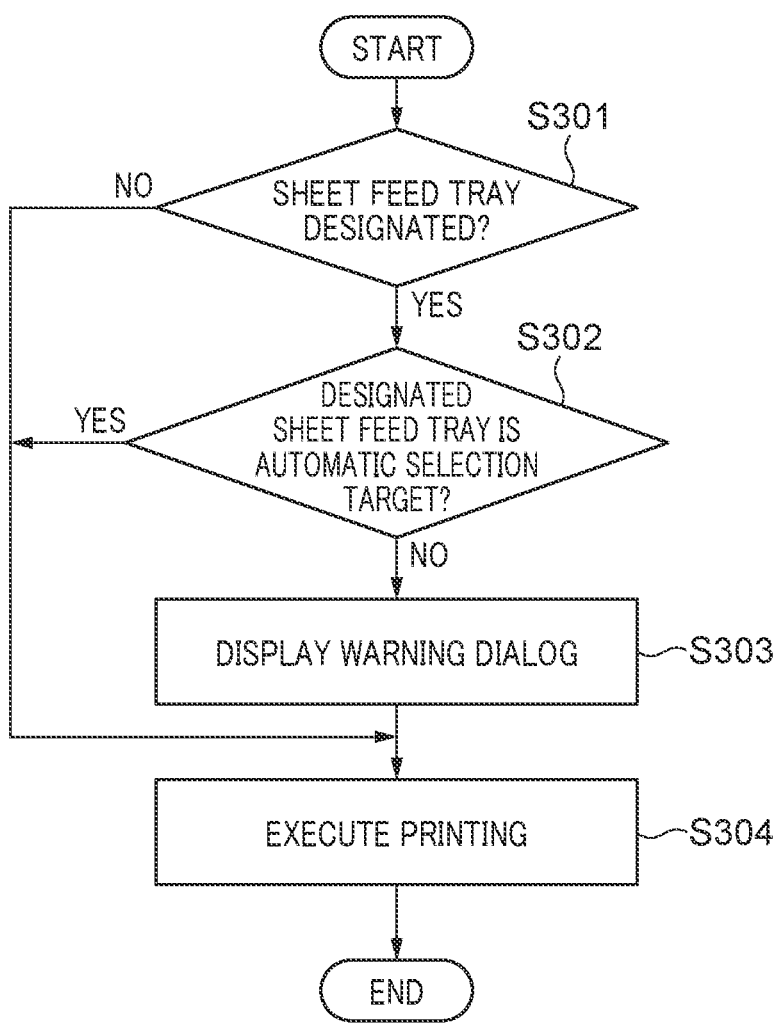
FIG. 14 is a flowchart of a job process.

FIG. 14 is a flowchart of a job process. This process is realized by the CPU 114 that loads an associated program stored in the ROM 112 into the RAM 113 and executes the loaded program. This process is started when a print job is input.

FIG. 15 is a diagram showing an example of a state confirmation screen. This state confirmation screen, denoted by reference numeral 1310, is displayed on the screen of the console panel 120. The state confirmation screen 1310 displays a list of input print jobs. Note that the screen on the console panel 120 is switched to the state confirmation screen 1300 (appearing in FIG. 12) by the notification processing (step S109 in FIG. 10) for a predetermined time period. In the illustrated example in FIG. 15, the state confirmation screen 1310 displays that five print jobs have been input and that printing of the first job is being executed and the waiting time to the end of printing is approximately two minutes.

In a step S301 in FIG. 14, the CPU 114 (the job management section 602) determines whether or not a received print job is a job in which a sheet feed tray is designated. If the received print job is a job in which a sheet feed tray is designated, the CPU 114 proceeds to a step S302. However, if the received print job is not a job in which a sheet feed tray is designated, the CPU 114 proceeds to a step S304, wherein a printing process is executed. In other words, the CPU 114 starts or continues printing. In a case where the process proceeds from the step S301 to the step S304, the sheet feed tray is selected as described with reference to FIG. 11.

In the step S302, the CPU 114 (the job management section 602) determines whether or not the designated sheet feed tray is an automatic selection target by sending an inquiry to the sheet management section 603. If the designated sheet feed tray is an automatic selection target, this sheet feed tray can be used without any problem, and hence the CPU 114 proceeds to the step S304. In the step S304 in this case, printing is executed using the designated sheet feed tray 325.

On the other hand, if the designated sheet feed tray is not an automatic selection target, there is a possibility that the humidity of the sheets is not stable, and hence the CPU 114 (the console section controller 601) displays a warning dialog (warning screen) in a step S303.

Figure 16:
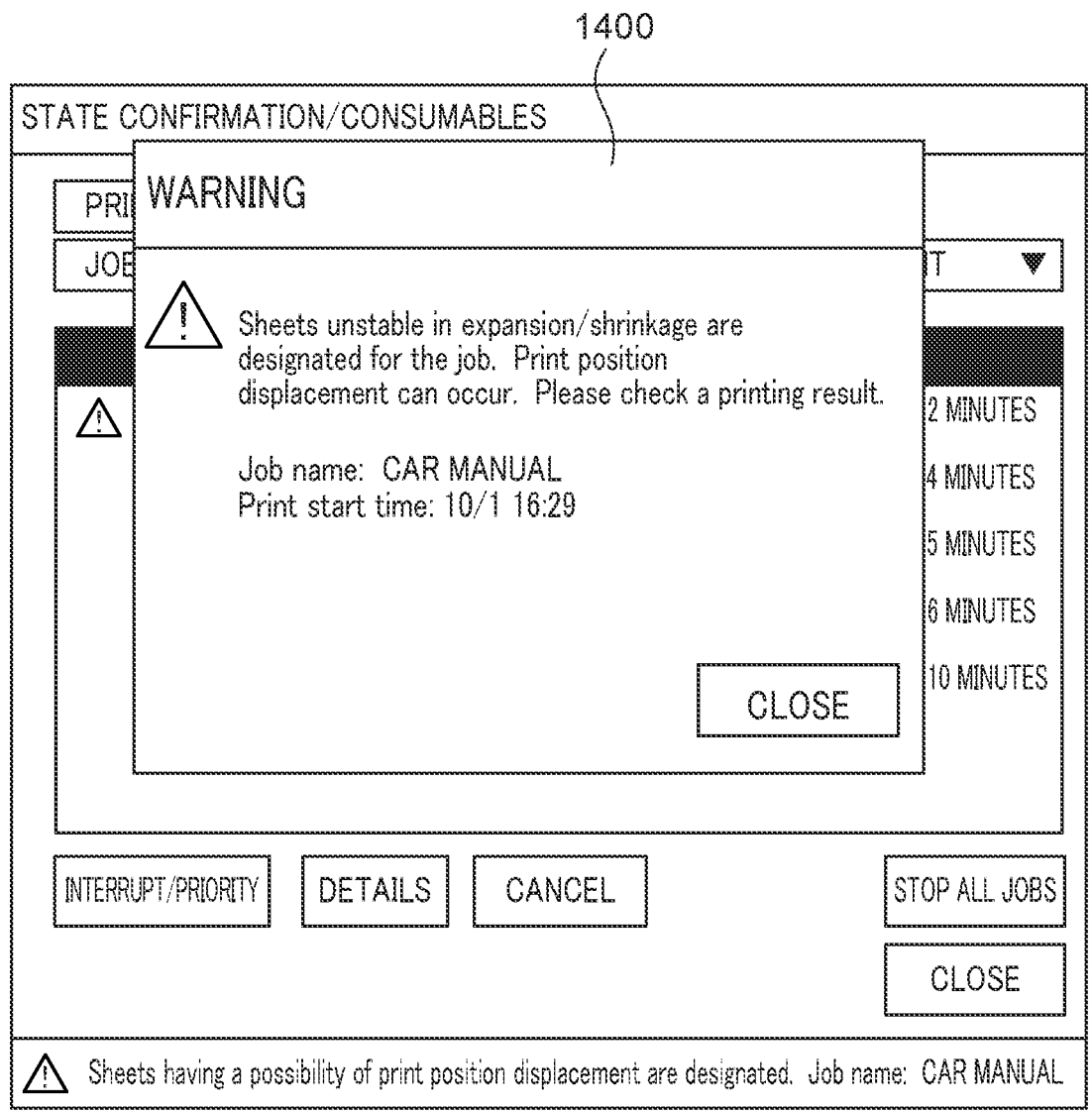
FIG. 16 is a diagram showing an example of a warning dialog.

For example, the CPU 114 (the console section controller 601) displays a warning dialog 1400 as shown in FIG. 16 on the console panel 120. The warning dialog 1400 is displayed in a state superimposed on the state confirmation screen 1310 (appearing in FIG. 15). This makes it possible to notify the operator that the sheets for printing are used in a state liable to expand or shrink and hence may cause print position displacement.

Further, at this time, on the state confirmation screen 1310 (appearing in FIG. 15), a warning icon 1311 is displayed for the print job as the target of the warning dialog. Further, a status column 1312 in a bottom portion of the screen displays a message to the effect that a sheet having a possibility of print position displacement is designated for the job being executed. The warning icon 1311 and the status column 1312 are continuously displayed even after the warning dialog 1400 is closed. This enables the user to recognize that the warning has been notified for the job being executed.

In the printing process performed in the case where the process proceeds from the step S303 to the step S304, printing is executed using the designated sheet feed tray 325. Therefore, even when the sheet feed tray 325 is a sheet feed tray as the non-target of automatic selection, the corresponding sheet feed tray 325 is used after the warning is provided. After that, the CPU 114 terminates the process in FIG. 14. A sequence of the job process performed in the case where the process proceeds from the step S303 to the step S304 will be described hereinafter with reference to FIG. 17.

Figure 17:
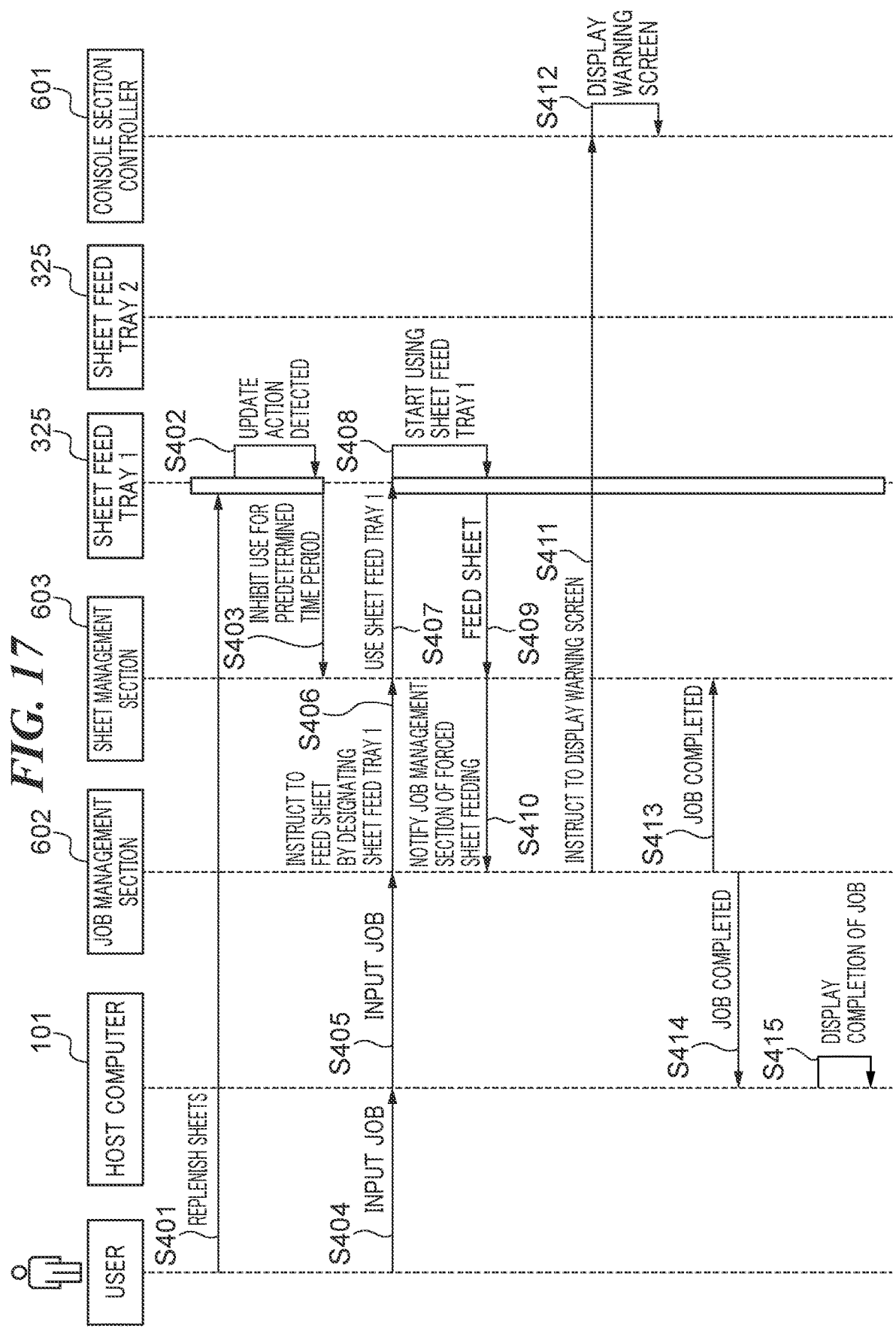
FIG. 17 is a diagram showing a sequence of a job process.

A specific example of execution of the print job in which a sheet feed tray is designated will be described with reference to FIG. 17. FIG. 17 is a diagram showing the sequence of the job process. It is assumed, for the print job described here by way of example, that the automatic selection function is specified to be enabled, and that a sheet feed tray to be used is designated. Further, it is assumed that "sheet feed tray 1" and "sheet feed tray 2" are the sheet feed trays 325 which are different from each other.

Steps S401 to S405 are the same as the steps S201 to S205 in FIG. 11. The job management section 602 instructs the sheet management section 603 to feed a sheet by designating a sheet feed tray to be used (S406). Therefore, the sheet management section 603 instructs sheet feed tray 1 to feed a sheet (S407). Although sheet feed tray 1 is not an automatic selection target, it starts feeding sheets (S408 and S409) and the sheet management section 603 notifies the job management section 602 that a sheet has been fed from the tray as the non-target of automatic selection (S410). The job management section 602 instructs the console section controller 601 to display the warning dialog (warning screen) so as to notify the operator that print position displacement can occur (S411). The console section controller 601 displays the warning dialog 1400 (appearing in FIG. 16) (S412). Steps S413 to S415 are the same as the steps S212 to S214 in FIG. 11.

Figure 18:
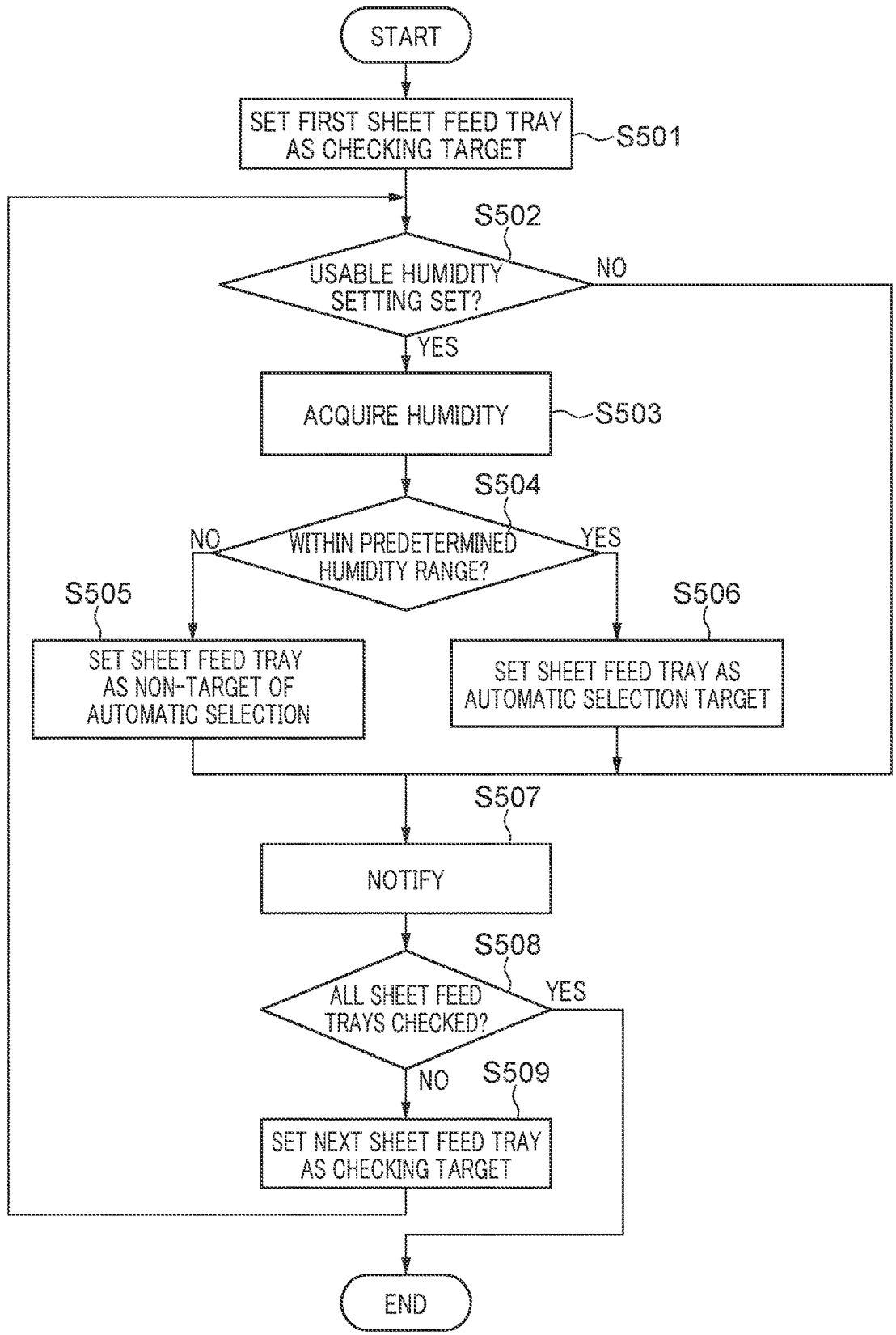
FIG. 18 is a flowchart of a variation of the selection target-setting process.

FIG. 18 is a flowchart of a variation of the selection target-setting process. This process is realized by the CPU 114 that loads an associated program stored in the ROM 112 into the RAM 113 and executes the loaded program. This process is periodically executed at predetermined time intervals. The variation of the selection target-setting process is performed in place of the selection target-setting process in FIG. 10.

First, in a step S501, similar to the step S101, the CPU 114 (the sheet management section 603) sets the first sheet feed tray 325 as a checking target. In a step S502, the CPU 114 (the sheet management section 603) determines whether or not the attribute 434 (appearing in FIG. 5B) indicative of the usable humidity setting is set to "set" for the sheet feed tray 325 as the checking target. As described hereinabove, the attribute 434 is set to "set" by checking the check box 513 (appearing in FIG. 6).

Then, if the attribute 434 is set to "not set" for the sheet feed tray 325 as the checking target, the CPU 114 (the sheet management section 603) proceeds to a step S507. On the other hand, if the attribute 434 is set to "set" for the sheet feed tray 325 as the checking target, the CPU 114 (the sheet management section 603) proceeds to a step S503.

In the step S503, the CPU 114 (the sheet management section 603) acquires the humidity of the sheet feed tray 325 as the checking target from the environment sensor 326. In a step S504, the CPU 114 (the sheet management section 603) determines whether or not the acquired humidity is within a predetermined humidity range. Here, the predetermined humidity range is determined by the attribute 435 (appearing in FIG. 5B). If it is determined in the step S504 that the acquired humidity is out of the predetermined humidity range, in a step S505, the CPU 114 (the sheet management section 603) excludes the sheet feed tray 325 as the checking target from the selection targets for the automatic selection function (sets the sheet feed tray as a non-target of automatic selection). This sheet feed tray 325 is controlled not to be selected as a sheet feed tray to be used until its humidity becomes within the predetermined humidity range. The use of the sheet feed tray 325 storing sheets whose humidity is unsuitable is inhibited, whereby occurrence of print position displacement is avoided.

On the other hand, if the acquired humidity is within the predetermined humidity range, in a step S506, the CPU 114 (the sheet management section 603) sets the sheet feed tray 325 as the checking target as a selection target in the automatic selection function (automatic selection target). Therefore, in the process of a print job for which the automatic selection function is specified to be enabled, this sheet feed tray 325 can be selected as the sheet feed tray to be used.

After execution of the step S505 or 506, in the step S507, the CPU 114 executes notification processing. This notification processing causes, for example, information indicating whether or not the corresponding sheet feed tray is an automatic selection target to be displayed at least in the automatic sheet tray selection column 1302 on the state confirmation screen 1300 shown in FIG. 12. Note that the notification processing may be performed by using voice.

In steps S508 and S509, the same processing operations in the steps S110 and S111 in FIG. 10 are executed, followed by terminating the process in FIG. 18.

In a case where the variation of the selection target-setting process is applied, the sheet feed tray 325 of which the humidity acquired is out of the predetermined humidity range is set to a non-target of automatic selection until the acquired humidity becomes within the predetermined humidity range. With this, the use of the sheet feed tray 325 storing sheets whose humidity is unsuitable is inhibited, whereby occurrence of print position displacement is avoided.

Note that the variation of the selection target-setting process in FIG. 18 may be performed in combination with the selection target-setting process in FIG. 10. In this case, the sheet feed tray 325 determined as the non-target of automatic selection in at least one of the step S105 and the step S505 is controlled not to be selected by automatic selection. The sheet feed tray 325 determined as the non-target of automatic selection is released from the control for inhibiting the sheet feed tray 325 from being selected by automatic selection (set as an automatic selection target) when this sheet feed tray 325 is determined as an automatic selection target in both of the processing operations corresponding to the steps S108 and S506.

According to the present embodiment, the sheet feed tray 325 for which an update action has been detected is controlled not to be selected as a sheet feed tray to be used until the predetermined time period elapses after detection of the update action. With this, the use of the sheet feed tray 325 storing sheets whose humidity is not stable immediately after the update action is inhibited. For example, acquisition of an erroneous adjustment value, caused by generating an adjustment chart using a sheet whose humidity is unsuitable immediately after an update action, is avoided. Therefore, it is possible to suppress print position displacement and thereby obtain a printing result having a high print accuracy. It is also possible to reduce wasted sheets. Note that the effect of reducing print position displacement by inhibiting the sheet feed tray 325 whose humidity is unstable from being selected can be obtained not only in generation of an adjustment chart, but also in normal image formation.

Further, the sheet feed tray 325 determined as a non-target of automatic selection is notified. What is more, a remaining time until a predetermined time period elapses after detection of an update action is notified for each sheet feed tray 325 determined not to be selected (see FIG. 12). Therefore, it is convenient for a user.

Further, in a case where the sheet feed tray 325 designated by a print job and the sheet feed tray 325 determined not to be selected match each other, a warning to the effect that print position displacement can occur is displayed (see FIG. 16). Further, even after the warning is displayed, printing is executed by using the sheet feed tray 325 designated by the print job. Therefore, it is possible to avoid delay of printing after calling a user's attention. What is more, during execution of a print job in a case where a warning has been provided, a message is displayed to the effect that the warning has been provided to the print job being executed (see FIG. 15). Therefore, it is possible to continuously call the user's attention.

Further, the control for excluding a sheet feed tray from the selection targets is not applied to the sheet feed tray 325 whose attribute 431 is set to "not set", regardless of whether or not a predetermined time period elapses. Further, the control for inhibiting a sheet feed tray from being selected as a sheet feed tray to be used until an acquired humidity becomes within the predetermined humidity range is applied on condition that the attribute 434 is set to "set". With these, high convenience can be obtained.

Further, the predetermined time period during which a sheet feed tray is controlled not to be selected as a sheet feed tray to be used is set according to the on/off state of the heater 324 (appearing in FIG. 5B). With this, it is possible to more properly inhibit the use of the sheet feed tray 325 storing sheets whose humidity is unstable, according to an environment.

A second embodiment of the present invention will be described with reference to FIGS. 19 to 25. In the first embodiment, the sheet feed tray 325 immediately after an update action is excluded from the automatic selection target. On the other hand, in the present embodiment, the adjustment values (appearing in FIG. 9) are corrected based on elapsed time after an update action. The basic configuration of the present embodiment is the same as that of the first embodiment, and the description of the same components and operations as those of the first embodiment is omitted.

FIG. 19 is a diagram showing an example of the sheet attribute edit screen 500 different from the illustrated example in FIG. 6. In this sheet attribute edit screen 500, a check box 522 is added to the sheet attribute edit screen 500 shown in FIG. 6. Further, the check box 508 is a box for specifying whether or not to perform automatic print position adjustment as an interrupt mode. Text boxes 523 and 524 associated with the check box 508 are provided in place of the check box 509. The check box 508 and the text boxes 523 and 524 are used in a third embodiment, described hereinafter.

The check box 522 is a box for specifying whether or not to correct an adjustment value in a case where an update action, such as replenishment of sheets, has been performed. When the check box 522 is checked, an attribute 441 (see FIG. 25) on the sheet library edit screen 400 is set to "execute". The attribute 441 is information specifying execution of correction of an adjustment value by taking into account a length of sheet expansion/shrinkage after replenishment, and when the attribute 441 is set to "execute", correction of the adjustment value is executed.

Figure 20:
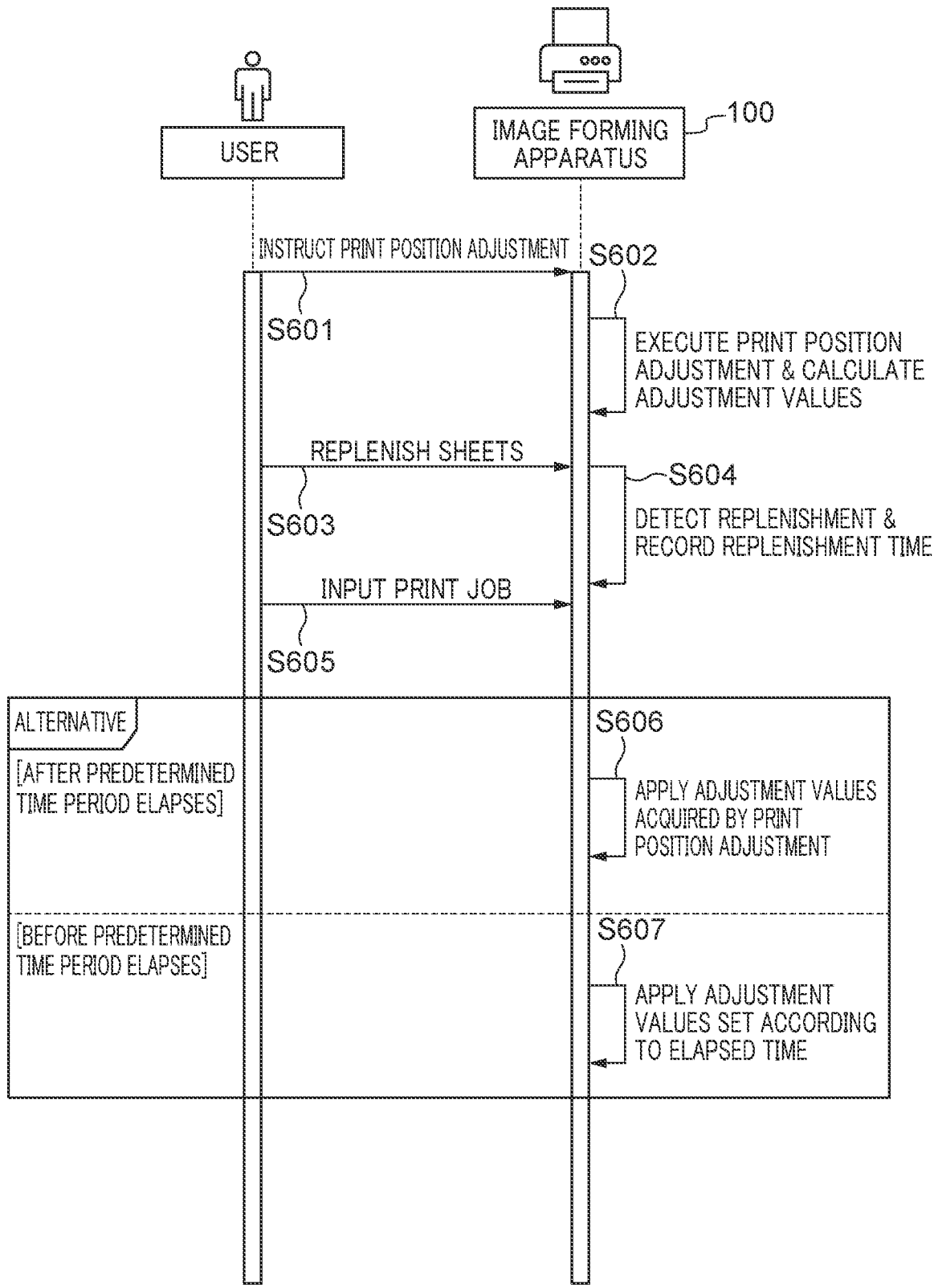
FIG. 20 is a diagram showing a sequence of a job process.

FIG. 20 is a diagram showing a sequence of a job process. It is assumed in the print job described here by way of example that a sheet feed tray to be used is designated. The attribute 441 (appearing in FIG. 25) is assumed to be set to "execute".

First, a user instructs the image forming apparatus 100 to perform print position adjustment (S601). The image forming apparatus 100 acquires adjustment values by printing and reading an adjustment chart (S602). In a case where sheets to be used for printing run short, the user replenishes sheets (S603). When it is detected that sheets have been replenished (an update action has been performed), the image forming apparatus 100 records the replenishment time (S604). The user inputs a print job for obtaining a printing result to the image forming apparatus 100 (S605).

During execution of printing, the image forming apparatus 100 executes two kinds of different processing operations depending on whether or not a predetermined time period has elapsed from the update action time. First, if the predetermined time period has elapsed, the image forming apparatus 100 executes print position adjustment directly using the acquired adjustment values (S606). However, if the predetermined time period has not elapsed, the image forming apparatus 100 executes print position adjustment using values obtained by correcting the acquired adjustment values (S607). The correction values for correcting the adjustment values are values set according to the time period elapsed from the update action time and will be described hereinafter with reference to FIGS. 22A and 22B. This is to cope with sheet expansion/shrinkage ascribable to the state of sheets unstable in humidity.

FIG. 21 is a diagram showing a method of calculating correction values. FIGS. 22A and 22B are diagrams each showing a table specifying addition/subtraction values according to the time which has elapsed from an update action time. The addition/subtraction value is information concerning an image writing start position. This table is acquired based on experimental values in advance and is stored in the ROM 112 or the HDD 115.

Adjustment values to be corrected are, for example, a length in the sub scanning direction (physical amount A) and a length in the main scanning direction (physical amount B). These values are corrected with respect to the front side and the reverse side of a sheet, respectively. Each adjustment value is corrected by a correction value therefor. Each addition/subtraction value appearing in FIGS. 22A and 22B corresponds to this correction value.

In the table shown in FIG. 22A, denoted by reference numeral 1101, the addition/subtraction values for a sheet whose sheet type and sheet size are "plain paper 1" and "A3", respectively, are specified for each elapsed time after an update action time, with respect to the sub scanning direction and the main scanning direction. The sheet has a large amount of change caused by expansion/shrinkage immediately after replenishment, and the amount of change becomes smaller as the time elapses. For this reason, the addition/subtraction value is set to a larger value as the elapsed time is shorter. In other words, the degree of correction of the adjustment value is larger in a case where the elapsed time is a second time, which is shorter than a first time, than in a case where the elapsed time is the first time.

Note that in the table 1101, if the elapsed time is not shorter than 20 minutes, the addition/subtraction value is equal to "0". Therefore, in a case where the elapsed time is 20 minutes or more, the adjustment values are not substantially corrected.

In the table shown in FIG. 22B, denoted by reference numeral 1102, the addition/subtraction values for a sheet whose sheet type and sheet size are "thick paper 1" and "A3", respectively, are specified for each elapsed time after an update action time, with respect to the sub scanning direction and the main scanning direction, respectively. In the table 1102, in a case where the elapsed time is 30 minutes or more, the adjustment values are not substantially corrected. The thick paper contains a larger amount of moisture and has a larger area than the plain paper, and hence the amount of change caused by expansion/shrinkage immediately after replenishment is also larger. For this reason, a longer time is required before the amount of expansion/shrinkage is converged to 0, and hence the addition/subtraction values are larger than 0 in a case where the elapsed time is shorter than 30 minutes. Besides, although not shown, tables each specifying addition/subtraction values are provided on a sheet type-by-sheet type basis.

FIG. 21 shows a case where a sheet of plain paper 1 and A3 (length in the main scanning direction=297 mm and length in the sub scanning direction=420 mm) is printed within two minutes after an update action time by way of example. For the main scanning magnification of the front side, the main scanning magnification 803 indicated in FIG. 9 is referred to. In each expression of the measured value 820, the ideal value 821, and the print position displacement amount 822, an addition/subtraction value of 1 mm is added to the physical amount B. By doing this, the print position displacement amount after correction becomes equal to 0.0036. This is the corrected adjustment value for the main scanning magnification on the front side.

Similarly, the sub scanning magnification 804 indicated in FIG. 9 is referred to. In each expression of the measured value 820, the ideal value 821, and the print position displacement amount 822, an addition/subtraction value of 1 mm is added to the physical amount A. By doing this, the print position displacement amount after correction becomes equal to 0.0025. This is the corrected adjustment value for the sub scanning magnification on the reverse side. In a case where a print job is executed using the sheet feed tray 325 before the predetermined time period elapses after an update action time, an image is formed using the corrected adjustment values.

Figure 23:
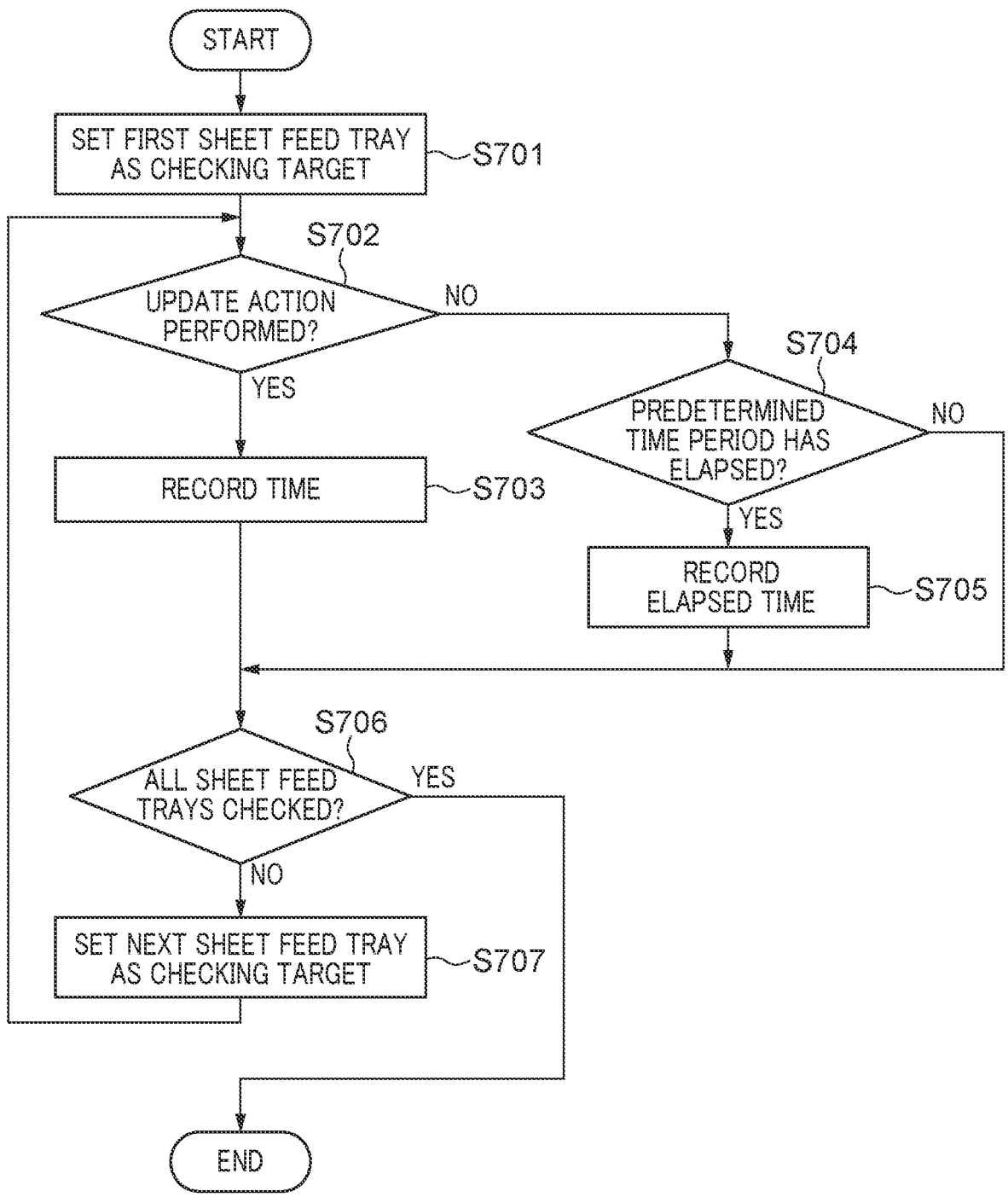
FIG. 23 is a flowchart of an elapsed time management process.
Figure 24:
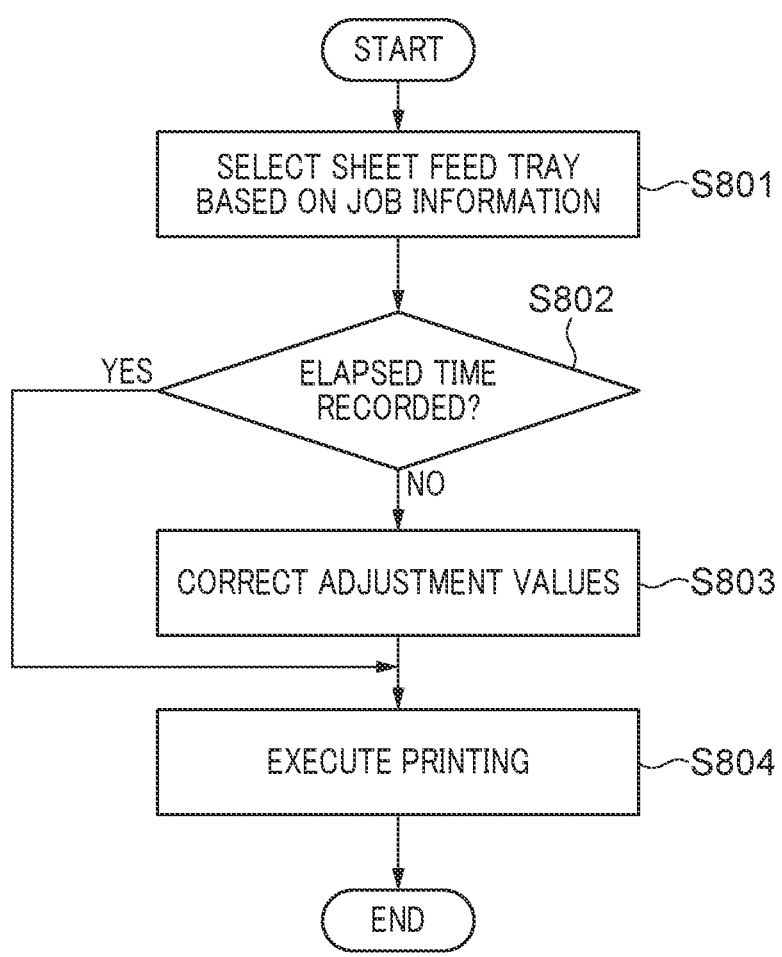
FIG. 24 is a flowchart of a printing process.

FIG. 23 is a flowchart of an elapsed time management process. FIG. 24 is a flowchart of a printing process. The processes in FIGS. 23 and 24 are realized by the CPU 114 that loads associated programs stored in the ROM 112 into the RAM 113 and executes the loaded programs. The process in FIG. 23 is periodically executed at predetermined time intervals. The process in FIG. 24 is started when a print job is input.

FIG. 25 is a diagram showing an example of the sheet library edit screen 400. In FIG. 25, attributes which cannot be displayed in FIGS. 5A and 5B are displayed for each sheet type. For example, not only the attribute 441, but also attributes 442 and 443 are displayed.

In a step S701 in FIG. 23, similar to the step S101 in FIG. 10, the CPU 114 (the sheet management section 603) sets the first sheet feed tray 325 as a checking target. In a step S702, similar to the step S102 in FIG. 10, the CPU 114 (the sheet management section 603) determines whether or not an update action has been performed for the sheet feed tray 325 as the checking target. Then, if an update action has been performed for the sheet feed tray 325 as the checking target, the CPU 114 proceeds to a step S703, whereas if not, the CPU 114 proceeds to a step S704.

In the step S703, the CPU 114 (the sheet management section 603) records a time at which the update action was performed for the sheet feed tray 325 as the checking target in the RAM 113 as an update action time and starts the timer. In steps S706 and S707, the CPU 114 executes the same processing operations as the steps S110 and S111 in FIG. 10 and returns to the step S702.

In the step S704, the CPU 114 (the sheet management section 603) determines whether or not the predetermined time period has elapsed from the update action time for the sheet feed tray 325 as the checking target. The update action time referred to here is the time recorded in the step S703. Further, the predetermined time period referred to here is a minimum time at which the addition/subtraction values become equal to "0" in an associated one of the tables described above with reference to in FIGS. 22A and 22B. If the predetermined time period has elapsed from the update action time, it is assumed that expansion/shrinkage of the sheets in the corresponding sheet feed tray 325 has become stable, and hence the CPU 114 (the sheet management section 603) records information indicating that the predetermined time period has elapsed (step S705) and proceeds to the step S706. On the other hand, if the predetermined time period has not elapsed from the update action time, the CPU 114 (the sheet management section 603) proceeds to the step S706.

In the process in FIG. 24, it is assumed that the attribute 441 (appearing in FIG. 25) on the sheet library edit screen 400 is set to "execute". Further, it is assumed that an input print job designates specific printing conditions, such as a sheet type. In a step S801, the CPU 114 (the sheet management section 603) selects the sheet feed tray 325 to be used for printing based on the job information acquired from the job management section 602. For example, if only one sheet feed tray 325 satisfies the specific printing conditions, the corresponding sheet feed tray 325 is selected. If a plurality of sheet feed trays 325 satisfy the specific printing conditions, one of the sheet feed trays 325, which is longest in the elapsed time from the update action time, is selected.

In a step S802, the CPU 114 (the sheet management section 603) determines whether or not information indicating that the predetermined time period has elapsed has been recorded for the selected sheet feed tray 325. Then, if the information indicating that the predetermined time period has elapsed has been recorded, the CPU 114 (the sheet management section 603) executes printing in a step S804. In this case, print position adjustment is performed directly using the acquired adjustment values. On the other hand, if the information indicating that the predetermined time period has elapsed has not been recorded, the CPU 114 (the sheet management section 603) executes a step S803 and then proceeds to the step S804.

In the step S803, the CPU 114 (the sheet management section 603) corrects the adjustment values with the correction values (described with reference to FIGS. 22A and 22B) associated with the selected sheet feed tray 325. In the next step S804, print position adjustment is performed using the corrected adjustment values.

According to the present embodiment, the adjustment values are corrected based on time which has elapsed after detection of an update action. In a state in which the humidity of sheets is unstable immediately after the update action, print position adjustment is performed using the corrected adjustment values. Therefore, it is possible to obtain the same advantageous effects as provided by the first embodiment for reduction of print position displacement.

For example, the CPU 114 corrects, for each sheet feed tray, adjustment values based on elapsed time before a predetermined time elapses after detection of an update action and does not correct the adjustment values after the predetermined time period elapses. Since the degree of correction is larger as the elapsed time is shorter (see FIGS. 22A and 22B), it is possible to correct the adjustment values using proper correction values dependent on a change in the humidity of sheets. Further, since the correction values are set, on a sheet type-by-sheet type basis, (as described with reference to FIGS. 22A and 22B), it is possible to use proper correction values according to the sheet type.

The third embodiment of the present invention will be described mainly with reference to FIGS. 25 to 28. In the second embodiment, the adjustment values are corrected based on elapsed time after an update action time. On the other hand, in the present embodiment, the frequency of execution of processing for updating the adjustment values is controlled based on elapsed time after an update action time. The basic configuration of the present embodiment is the same as that of the second embodiment, and the description of the same components and operations as those of the second embodiment is omitted.

Figure 26:
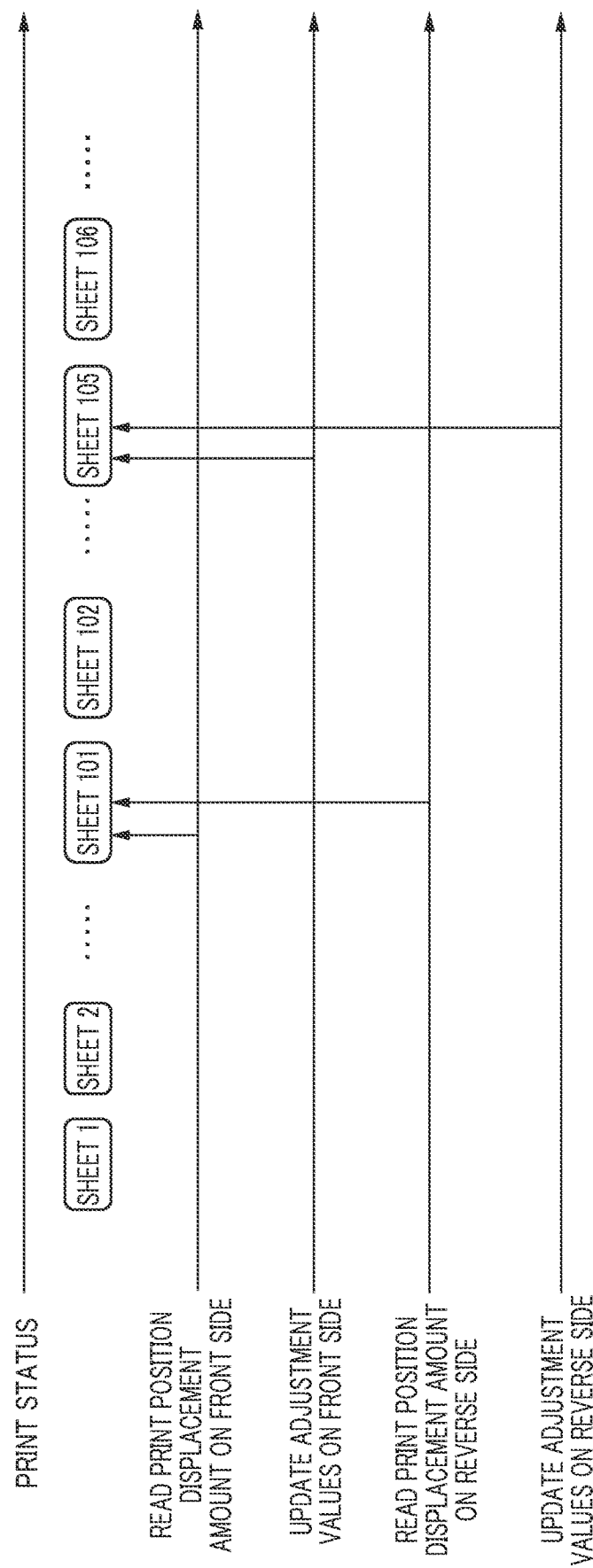
FIG. 26 is a conceptual diagram of interrupt automatic adjustment.

First, an interrupt automatic adjustment will be briefly described. FIG. 26 is a conceptual diagram of the interrupt automatic adjustment. The interrupt automatic adjustment is update processing for updating the adjustment values during a series of image formation processing operations. In the interrupt automatic adjustment, the adjustment chart is printed whenever a predetermined number of sheets are printed, aside from an input print job.

For example, the description with reference to FIG. 26 is given assuming that the adjustment chart is printed whenever 100 sheets are printed. When the 100-th sheet has been printed, the image forming apparatus 100 generates an adjustment chart using the 101st sheet. The image forming apparatus 100 reads print position displacement on the front side and the reverse side of the adjustment chart and acquires adjustment values. In a high-speed image forming apparatus, when the adjustment chart has been read by the reading device, several sheets have already been printed. To cope with this, in the illustrated example in FIG. 26, image formation is performed by reflecting the adjustment values on the 105-th sheet to be printed next. Therefore, it is possible to prevent print position displacement for the 105-th and subsequent sheets.

On the sheet library edit screen 400 (shown in FIG. 25), the attribute 442 indicates an interrupt automatic adjustment frequency (execution interval) at the normal time. The attribute 443 indicates an interrupt automatic adjustment frequency (execution interval) immediately after an update action (immediately after replenishment). Although the attributes 442 and 443 are set to default values in the illustrated example, a user can change them to desired values by rewriting the text boxes 523 and 524 (appearing in FIG. 19). As the values of the attributes 442 and 443 are larger, the execution interval is longer, i.e. the execution frequency is lower.

Figure 27:
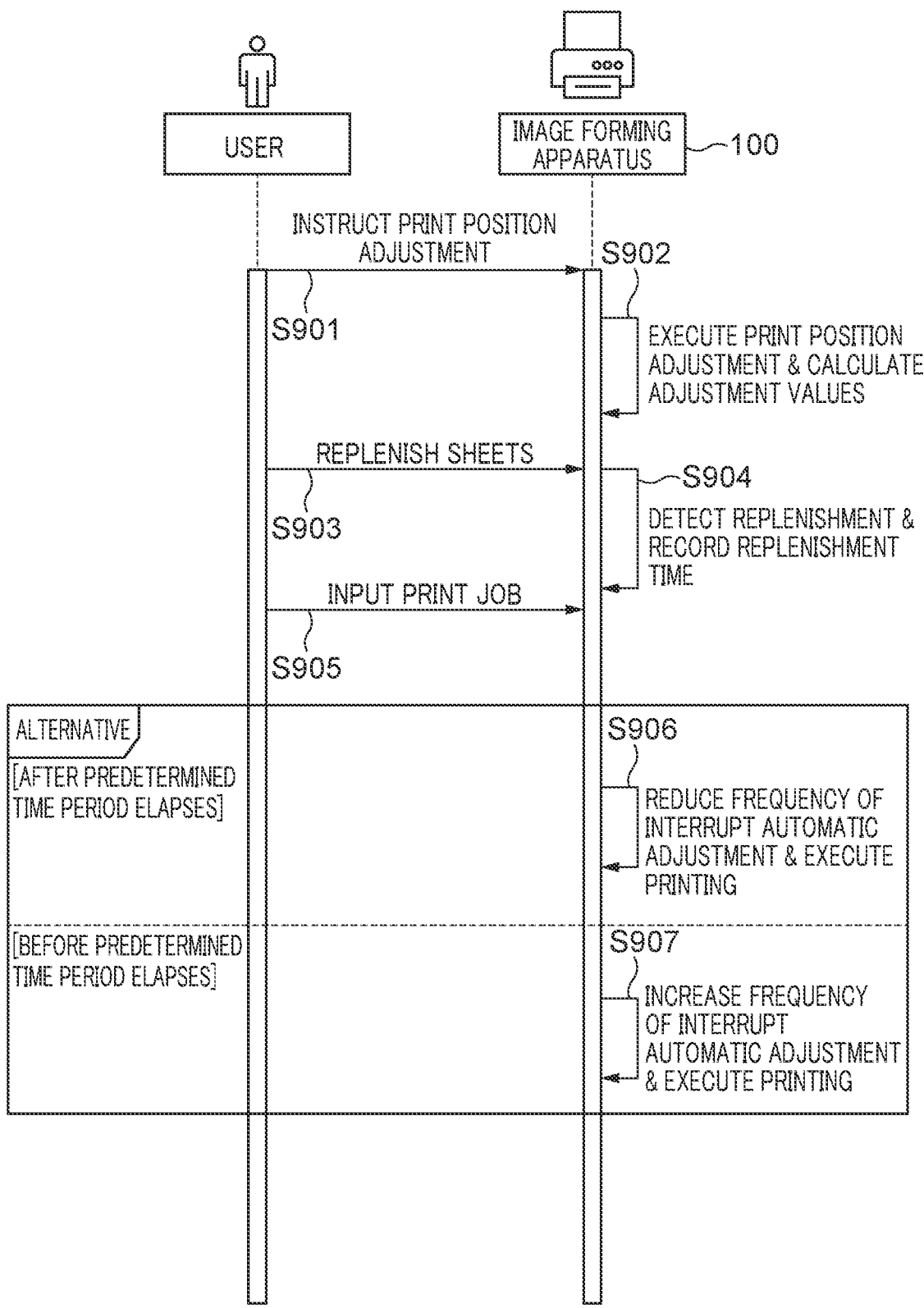
FIG. 27 is a diagram showing a sequence of a job process.

FIG. 27 is a diagram showing a sequence of a job process. For a print job described here by way of example, it is assumed that a sheet feed tray to be used is designated. The attribute 441 (appearing in FIG. 25) is assumed to be set to "execute". Steps S901 to S905 are the same as the steps S601 to S605 in FIG. 20.

The adjustment chart used in the automatic print position adjustment is not a product, and hence it is desirable to make the automatic print position adjustment in the interrupt mode lower in frequency (longer in interval). However, to take expansion/shrinkage of sheets into account immediately after replenishing sheets in the sheet feed tray, it is desirable to make the automatic print position adjustment relatively higher in frequency of (shorter in interval).

Therefore, during execution of printing, the image forming apparatus 100 executes two kinds of different processing operations depending on whether or not a predetermined time period has elapsed after an update action time. First, in a case where the predetermined time period has not elapsed from the update action time for the designated sheet feed tray, the image forming apparatus 100 executes a print job using a value obtained by increasing the frequency of the interrupt automatic adjustment (S907). For example, when the value of the attribute 443 (appearing in FIG. 25) is set to "40", automatic adjustment is executed once whenever 40 sheets of images are formed. On the other hand, in a case where the predetermined time period has elapsed from the update action time for the designated sheet feed tray, the image forming apparatus 100 executes a print job using a value obtained by reducing the frequency of the interrupt automatic adjustment (S906). For example, when the value of the attribute 442 (appearing in FIG. 25) is set to "2000", automatic adjustment is executed once whenever 2000 sheets of images are formed.

Therefore, during a time period in which sheet expansion/shrinkage is liable to occur as in a state immediately after replenishing sheets, the interrupt automatic adjustment is more frequently executed, whereby print position displacement is suppressed. On the other hand, in a situation in which the predetermined time period has elapsed and sheet expansion/shrinkage does not occur, the interval of the interrupt automatic adjustment is increased, whereby wasted sheets are reduced. The attributes 442 and 443 are information specifying the frequency of the update processing for updating the adjustment values before and after the predetermined time elapses after an update action time, respectively.

Figure 28:
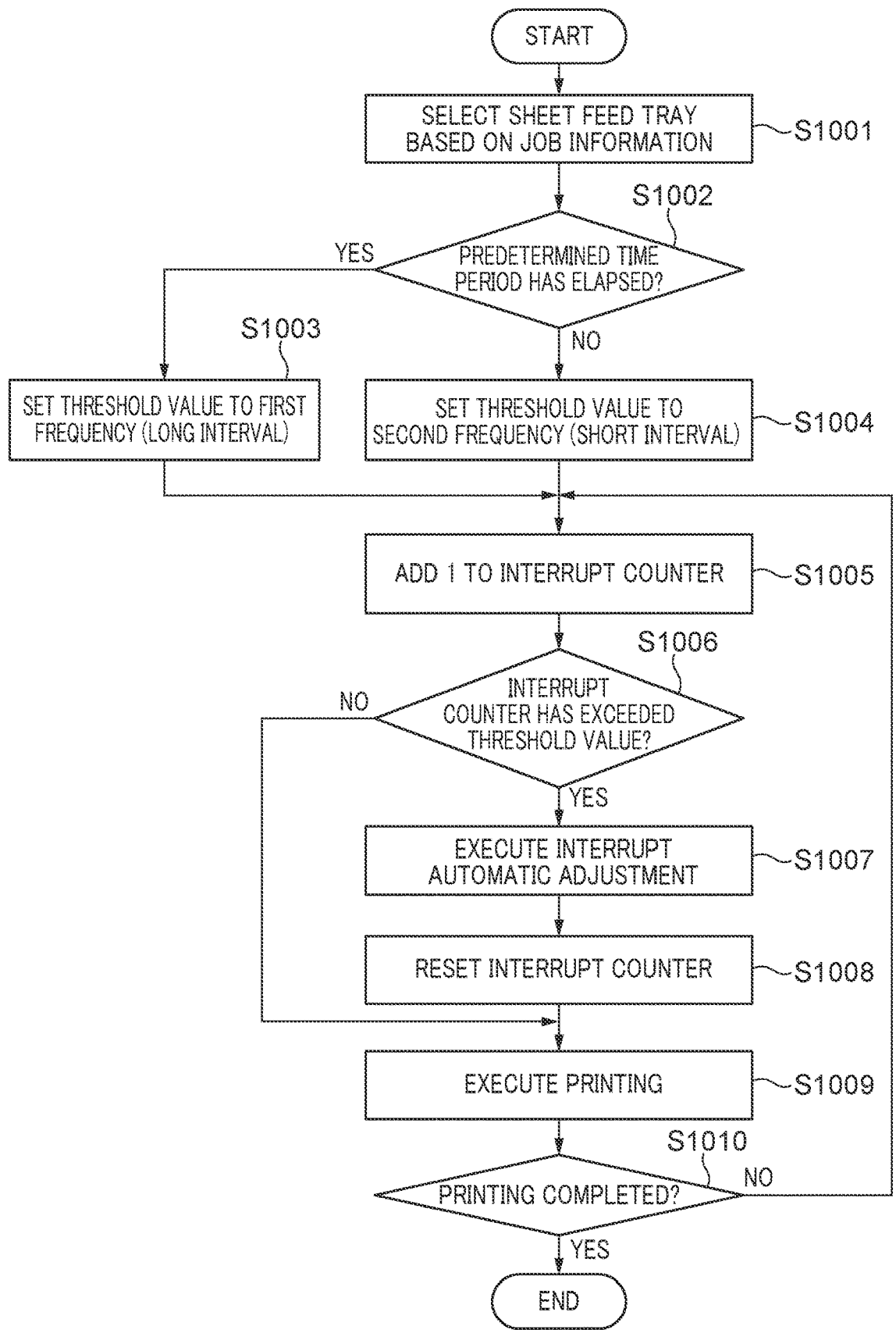
FIG. 28 is a flowchart of the printing process.

FIG. 28 is a flowchart of a printing process. This process is realized by the CPU 114 that loads an associated program stored in the ROM 112 into the RAM 113 and executes the loaded program. This process is started when a print job is input. It is assumed, for a print job described here by way of example, that a sheet feed tray to be used is designated. The attribute 441 (appearing in FIG. 25) is assumed to be set to "execute". Further, in the present embodiment, the elapsed time management process in FIG. 23 is also executed.

In the process in FIG. 28, it is assumed that the input print job designates specific printing conditions, such as a sheet type. In a step S1001, the CPU 114 (the sheet management section 603) executes the same processing as in the step S801 in FIG. 24. In a step S1002, the CPU 114 (the sheet management section 603) determines whether or not the predetermined time period has elapsed from the update action time for the selected sheet feed tray 325. The update action time referred to here is the time recorded in the step S703 in FIG. 23.

If the predetermined time period has elapsed from the update action time for the selected sheet feed tray 325, in a step S1003, the CPU 114 (the sheet management section 603) sets a first frequency (low, i.e. long interval) as a threshold value and proceeds to a step S1005. On the other hand, if the predetermined time period has not elapsed from the update action time, in a step S1004, the CPU 114 (the sheet management section 603) sets a second frequency (high, i.e. short interval) as the threshold value and proceeds to the step S1005. Here, the first frequency is a value of the attribute 442 (appearing in FIG. 25) associated with the selected sheet feed tray 325. The second frequency is a value of the attribute 443 (appearing in FIG. 25) associated with the selected sheet feed tray 325.

In the step S1005, the CPU 114 (the sheet management section 603) increments (adds 1 to) an interrupt counter associated with the selected sheet feed tray 325. Note that the interrupt counter is provided for each sheet feed tray 325. In a step S1006, the CPU 114 (the sheet management section 603) determines whether or not the interrupt counter has exceeded the threshold value. If the interrupt counter has not exceeded the threshold value, it is not time to execute the interrupt automatic adjustment, and hence the CPU 114 (the sheet management section 603) proceeds to a step S1009. In the step S1009, in this case, the printing process is executed or continued using the current adjustment values without executing automatic adjustment.

On the other hand, if the interrupt counter has exceeded the threshold value, it is time to execute the interrupt automatic adjustment, and hence in a step S1007, the CPU 114 (the sheet management section 603) executes the interrupt automatic adjustment to update the adjustment values for use in printing. In a step S1008, the CPU 114 (the sheet management section 603) resets the interrupt counter associated with the selected sheet feed tray 325 in preparation for the next interrupt automatic adjustment. In the next step S1009, in this case, the printing process is executed or continued using the updated adjustment values.

In a step S1010, the CPU 114 determines whether or not all pages of the print job have been printed. Then, if all pages of the print job have not been printed, the CPU 114 returns to the step S1005, whereas if all pages of the print job have been printed, the CPU 114 terminates the process in FIG. 28.

According to the present embodiment, the execution frequency of the processing for updating the adjustment values is controlled based on elapsed time after detection of an update action. For example, the humidity of sheets is unstable before the predetermined time period elapses after detection of an update action, and hence the update processing is executed at a frequency higher than after the predetermined time period elapses. Therefore, it is possible to obtain the same advantageous effects as provided by the second embodiment with respect to reduction of print position displacement.

Further, as the frequencies of the update processing for updating the adjustment values before and after the predetermined time period elapses from the update action time, the attributes 442 and 443 can be set by a user, and hence it is convenient for the user.

Note that the image forming apparatus 100 of the present invention is only required to have sheet feed trays and the image forming function and is not necessarily required to have the reading function and the post-processing function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-104600, filed Jun. 17, 2020, which is hereby incorporated by reference herein in its entirety.

What is claimed is:

1. An image forming apparatus comprising:
a plurality of sheet storage sections configured to store sheets;
an image forming device configured to form an image on a sheet supplied from one sheet storage section of the plurality of sheet storage sections; and
one or more controllers configured to function as:
a first unit configured to detect an update action performed by sheet replenishment or sheet replacement for one or more sheet storage sections of the plurality of sheet storage sections, wherein each sheet storage section of the plurality of sheet storage sections is respectively set, by a user operation, whether or not to execute a process for prohibiting a predetermined image forming processing when the update action is detected, until a predetermined time period elapses; and
a second unit configured to automatically prohibit the predetermined image forming processing using the one or more sheet storage sections for which the user has set to execute the process for prohibiting the predetermined image forming processing and the update action is detected until the predetermined time period elapses after detection of the update action, and automatically permit the predetermined image forming processing using other sheet storage sections of the plurality of sheet storage sections of the plurality of sheet storage sections for which the update action is not detected,
wherein the predetermined image forming processing is a process of causing the image forming device to form a predetermined image for measuring the position of the formed image on a sheet.

2. The image forming apparatus according to claim 1, wherein the one or more controllers provide notification of the one or more sheet storage sections determined to be prohibited.

3. The image forming apparatus according to claim 1, wherein, in a case where a sheet storage section designated by a user as a sheet storage section to be used and a sheet storage section determined to be prohibited match each other, the one or more controllers provide a warning to the effect that print position displacement can occur.

4. The image forming apparatus according to claim 3, wherein the one or more controllers select the designated sheet storage section after providing the warning to the effect that print position displacement can occur.

5. The image forming apparatus according to claim 4, wherein, when the warning to the effect that print position displacement can occur has been provided, the one or more controllers display a display to the effect that the warning has been provided for a print job for forming an image on a sheet supplied from the designated sheet storage section.

6. The image forming apparatus according to claim 1,
wherein the one or more controllers associate a first predetermined designation with each sheet storage section according to the user operation, and
wherein the one or more controllers perform control for prohibiting a sheet storage section from being selected until the predetermined time period elapses after detection of an update action, for a sheet storage section associated with the first predetermined designation, and do not apply the control for prohibiting another sheet storage section from being selected, for another sheet storage section which is not associated with the first predetermined designation regardless of whether or not the predetermined time period elapses.

7. The image forming apparatus according to claim 1, wherein the predetermined time period is set by a user.

8. The image forming apparatus according to claim 1, wherein the one or more controllers notify a user of remaining time until the predetermined time period elapses after detection of an update action, on a sheet storage section-by-storage section basis.

9. The image forming apparatus according to claim 1,
wherein the one or more controllers are further configured to function as an acquisition unit configured to acquire humidity of each of the plurality of sheet storage sections, and
wherein the one or more controllers perform, for a sheet storage section of which the humidity acquired by the acquisition unit is out of a predetermined humidity range and for which the user has set to execute the process for prohibiting the predetermined image forming processing, control for prohibiting the sheet storage section from being selected until the acquired humidity becomes within the predetermined humidity range.

10. The image forming apparatus according to claim 9,
wherein the one or more controllers associate a second predetermined designation with each sheet storage section according to a user operation, and
wherein the one or more controllers apply, for the sheet storage section of which the humidity acquired by the acquisition unit is out of the predetermined humidity range and for which the user has set to execute the process for prohibiting the predetermined image forming processing, the control for prohibiting the sheet storage section from being selected until the acquired humidity becomes within the predetermined humidity range on condition that the second predetermined designation is associated with the sheet storage section.

11. The image forming apparatus according to claim 9, wherein the predetermined humidity range is set by a user.

* * * * *